United States Patent
Kang et al.

(10) Patent No.: US 11,682,790 B2
(45) Date of Patent: Jun. 20, 2023

(54) SULFIDE-BASED SOLID ELECTROLYTE, ALL-SOLID SECONDARY BATTERY INCLUDING THE SAME, AND METHOD OF PREPARING THE SULFIDE-BASED SOLID ELECTROLYTE

(71) Applicants: Samsung Electronics Co., Ltd., Suwon-si (KR); Samsung SDI Co., Ltd., Yongin-si (KR); JEONGKWAN Co., Ltd, Yangsan-si (KR)

(72) Inventors: Hyorang Kang, Anyang-si (KR); Minsuk Lee, Suwon-si (KR); Taeheung Kim, Yangsan-si (KR); Duckki Yoon, Yangsan-si (KR); Hyungsik Lim, Yangsan-si (KR)

(73) Assignees: SAMSUNG ELECTRONICS CO., LTD., Gyeonggi-do (KR); SAMSUNG SDI CO., LTD., Gyeonggi-do (KR); POSCO JK SOLID SOLUTION CO., LTD., Gyeongsangnam-do (KR)

( * ) Notice: Subject to any disclaimer, the term of this patent is extended or adjusted under 35 U.S.C. 154(b) by 309 days.

(21) Appl. No.: 16/791,296

(22) Filed: Feb. 14, 2020

(65) Prior Publication Data
US 2020/0287238 A1 Sep. 10, 2020

(30) Foreign Application Priority Data
Mar. 7, 2019 (KR) .................. 10-2019-0026477

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/008* (2013.01)

(58) Field of Classification Search
None
See application file for complete search history.

(56) References Cited

U.S. PATENT DOCUMENTS 10,340,506 B2   7/2019  Aihara et al.
2012/0009484 A1*  1/2012  Aburatani ............. C03C 4/18
                                                        429/322

(Continued)

FOREIGN PATENT DOCUMENTS

CN    105140560 B  *  4/2019  ........ H01M 10/0525
JP    2002109955 A  *  4/2002  ............ C03C 10/00

(Continued)

OTHER PUBLICATIONS

Ujiie et al.; "Preparation and electrochemical characterization of (100-x)(0.7Li2S-0.3P2S5)-xLiBr glass-ceramic electrolytes"; Mater. Renew. Sustain. Energy 3:18; pp. 1-8. (Year: 2014).*

Kato et al.; "Mechanical Properties of Li2S-P2S5 Glasses with Lithium Halides and Application in All-Solid-State Batteries"; ACS Appl. Energy Mater., 1 (2018), pp. 1002-1007. (Year: 2018).*

(Continued)

*Primary Examiner* — Gregg Cantelmo
(74) *Attorney, Agent, or Firm* — Cantor Colburn LLP

(57) ABSTRACT

A sulfide solid electrolyte includes: an ionic conductor including a $PS_4^{3-}$ unit, a $P_2S_6^{4-}$ unit, and a $P_2S_7^{4-}$ unit; and a lithium compound containing a halogen element, wherein a molar ratio of the $P_2S_6^{4-}$ unit to the $PS_4^{3-}$ unit is about 1:1 to about 5:1, and a molar amount of the $P_2S_7^{4-}$ unit with respect to the total molar amount of the $PS_4^{3-}$ unit, the $P_2S_6^{4-}$ unit, and the $P_2S_7^{4-}$ unit is greater than 0 to about 60%.

20 Claims, 9 Drawing Sheets

(56) References Cited

U.S. PATENT DOCUMENTS

| | | | | |
|---|---|---|---|---|
| 2014/0302382 A1* | 10/2014 | Kambara | .......... | H01M 10/0562 429/321 |
| 2015/0093652 A1 | 4/2015 | Aihara et al. | | |
| 2015/0207170 A1* | 7/2015 | Aburatani | ............... | C03C 3/323 429/306 |
| 2015/0214573 A1* | 7/2015 | Sastry | ................... | H01M 4/136 429/50 |

FOREIGN PATENT DOCUMENTS

| | | | |
|---|---|---|---|
| JP | 3433173 B2 | | 8/2003 |
| JP | 5458740 B2 | | 4/2014 |
| JP | 2015072773 A | | 4/2015 |
| JP | 2015125932 A | * | 7/2015 |
| JP | 2016117640 A | | 6/2016 |
| KR | 1020150039573 A | | 4/2015 |
| KR | 1020160064942 A | | 6/2016 |

OTHER PUBLICATIONS

Aoki et al.; "Chemical and structural changes of 70Li2S-30P2S5 solid electrolyte during heat treatment"; Solid State Ionics, vol. 310, pp. 50-55. (Year: 2017).*

Dietrich et al. "Lithium ion conductivity in Li2S-P285 glasses—building units and local structure evolution during the crystallization of superionic conductors Li3PS4, U7P3S11 and Li4P2S7"; J. Mater. Chem. A (5), pp. 18111-18119. (Year: 2017).* www.espacenet.com machine translation of CN-105140560-B. (Year: 2019).* www.espacenet.com machine translation of JP-2015125932-A (Year: 2015).*

Kim et al., "Materials Design Strategy for Halide Solid Electrolytes for All-Solid-State High-Voltage Li-Ion Batteries", Lawrence Livermore National Laboratory retrieved on Feb. 11, 2021, pp. 1-37 (corresponding to Chemistry of Materials, 2021, 33, 10, 3669-3677).

* cited by examiner

SULFIDE-BASED SOLID ELECTROLYTE, ALL-SOLID SECONDARY BATTERY INCLUDING THE SAME, AND METHOD OF PREPARING THE SULFIDE-BASED SOLID ELECTROLYTE

CROSS-REFERENCE TO RELATED APPLICATION

This application claims priority to and the benefit of Korean Patent Application No. 10-2019-0026477, filed on Mar. 7, 2019, in the Korean Intellectual Property Office, and all the benefits accruing therefrom under 35 U.S.C. § 119, the content of which is incorporated herein by reference in its entirety.

BACKGROUND

1. Field

The present disclosure relates to a sulfide-based solid electrolyte, an all-solid secondary battery including the same, and a method of preparing the sulfide-based solid electrolyte.

2. Description of the Related Art

Batteries having high energy density and high safety have been actively developed in accordance with industrial requirements. For example, lithium ion batteries have been commercially available in the automotive field as well as in the fields of information-associated equipment and communication equipment. In the automotive field, the safety of a battery is particularly important due to its ability to directly impact the life and safety of its human operator.

Commercially available lithium ion batteries include a liquid electrolyte including a flammable organic solvent, and thus there is a risk of overheating and fire when a short circuit occurs. Accordingly, there are advantages to an all-solid battery using a solid electrolyte instead of a liquid electrolyte.

An all-solid battery does not use a flammable organic solvent, thereby reducing the risk of fire or explosion if a short circuit occurs. Accordingly, such an all-solid battery may have improved safety as compared with a lithium ion battery using a liquid electrolyte.

Nonetheless, there remains a need for an improved solid electrolyte.

SUMMARY

A sulfide-based solid electrolyte may be an amorphous sulfide-based solid electrolyte or a crystalline sulfide-based solid electrolyte.

A crystalline sulfide-based solid electrolyte may form a stable solid electrolyte membrane upon reaction with lithium metal, and thus may be used as an electrolyte in an all-solid secondary battery. In order for a crystalline sulfide-based solid electrolyte to have high crystallinity, a high-temperature heat treatment, for example at 500° C. or greater, is applied. However, high-temperature heat treatment at 500° C. or greater may cause significant compositional change in the solid electrolyte. Therefore, there is a need for a sulfide-based solid electrolyte capable of being prepared without high-temperature heat treatment at 500° C. or greater.

An amorphous sulfide-based solid electrolyte not having high crystallinity may be prepared using a heat treatment temperature of about 350° C. or less. However, the amorphous sulfide-based solid electrolyte has a high reactivity with lithium metal, resulting in a continuous side reaction during charge and discharge of the all-solid secondary battery, making it difficult to form a stable solid electrolyte membrane. Therefore, there is a need for an amorphous sulfide-based solid electrolyte having improved stability with respect to lithium metal.

Provided herein is a sulfide-based solid electrolyte which is substantially amorphous and having improved stability with respect to lithium metal.

Provided is an all-solid secondary battery with improved cycle characteristics by inclusion of the novel sulfide-based solid electrolyte.

Provided is a method of preparing the novel sulfide-based solid electrolyte.

Additional aspects will be set forth in part in the description which follows and, in part, will be apparent from the description, or may be learned by practice of the presented embodiments.

According to an aspect of an embodiment, a sulfide solid electrolyte includes:

an ionic conductor including a $PS_4^{3-}$ unit, a $P_2S_6^{4-}$ unit, and a $P_2S_7^{4-}$ unit; and a lithium compound including a halogen element, wherein a molar ratio of the $P_2S_6^{4-}$ unit to the $PS_4^{3-}$ unit is about 1:1 to about 5:1, and a molar amount of the $P_2S_7^{4-}$ unit with respect to a total molar amount of the $PS_4^{3-}$ unit, the $P_2S_6^{4-}$ unit, and the $P_2S_7^{4-}$ unit is greater than 0 to about 60%.

According to an aspect of another embodiment, an all-solid secondary battery includes: a cathode layer; an anode layer; and a solid electrolyte layer disposed between the cathode layer and the anode layer, wherein the solid electrolyte layer includes the sulfide solid electrolyte.

According to an aspect of an embodiment, a method of preparing a sulfide solid electrolyte includes: providing a mixture including a starting material composition including the elements P, S, and Li, and a lithium compound containing a halogen element; and treating the mixture to prepare the sulfide solid electrolyte, wherein the sulfide solid electrolyte includes an ionic conductor including a $PS_4^{3-}$ unit, a $P_2S_6^{4-}$ unit, and a $P_2S_7^{4-}$ unit, and the lithium compound containing a halogen element, wherein a molar ratio of the $P_2S_6^{4-}$ unit to the $PS_4^{3-}$ unit is about 1:1 to about 5:1, and wherein a molar amount of the $P_2S_7^{4-}$ unit with respect to the total molar amount of the $PS_4^{3-}$ unit, the $P_2S_6^{4-}$ unit, and the $P_2S_7^{4-}$ unit is greater than 0 to about 60%.

According to an aspect of an embodiment, a sulfide solid electrolyte includes:

an ionic conductor comprising a $PS_4^{3-}$ unit, a $P_2S_6^{4-}$ unit, and a $P_2S_7^{4-}$ unit; and a lithium compound comprising a halogen element, wherein an amount of the lithium compound is about 3 weight percent to about 22 weight percent with respect to the total weight of the sulfide solid electrolyte, wherein a molar ratio of the $P_2S_6^{4-}$ unit to the $PS_4^{3-}$ unit is about 1:1 to about 5:1, and a molar amount of the $P_2S_7^{4-}$ unit with respect to the total molar amount of the $PS_4^{3-}$ unit, the $P_2S_6^{4-}$ unit, and the $P_2S_7^{4-}$ unit is greater than 0 to about 60%, and wherein the sulfide solid electrolyte is a reaction product of a raw material composition comprising the elements P, S, and Li, and the lithium compound containing the halogen element.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
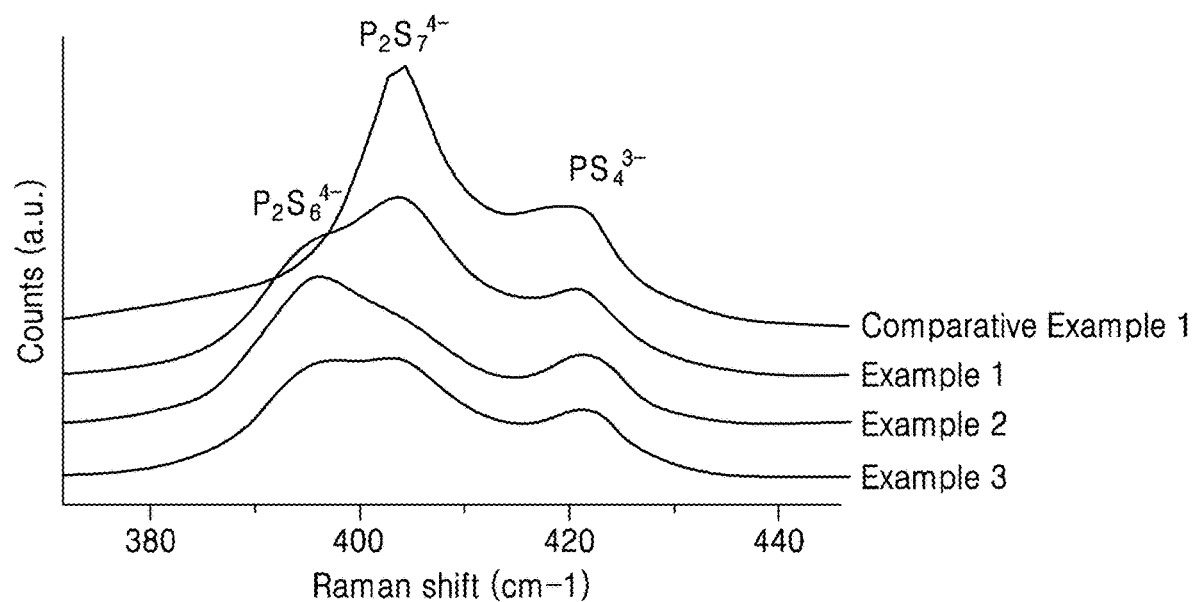
FIG. 1 is a graph of counts (arbitrary units, a.u.) versus Raman shift (wavenumbers, $cm^{-1}$), which illustrates the Raman spectra of sulfide-based solid electrolytes prepared in Examples 1 to 3 and Comparative Example 1.

The present disclosure will now be described more fully with reference to the accompanying drawings, in which various embodiments are shown. The present disclosure may, however, be embodied in many different forms, and should not be construed as being limited to the embodiments set forth herein. Rather, these embodiments are provided so that this disclosure will be thorough and complete, and will fully convey the effects and features of the present disclosure and ways to implement the disclosure to those skilled in the art.

The terminology used herein is for the purpose of describing particular embodiments only and is not intended to be limiting of the present disclosure. As used herein, the singular forms "a", "an," "the" and "at least one" do not denote a limitation of quantity, and are intended to cover both the singular and plural, unless the context clearly indicates otherwise. For example, "an element" has the same meaning as "at least one element," unless the context clearly indicates otherwise. "Or" means "and/or."

As used herein, the term "and/or" includes any and all combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the slash "/" or the term "and/or" includes any and all combinations of one or more of the associated listed items.

In the drawings, the size or thickness of each layer, region, or element are arbitrarily exaggerated or reduced for better understanding or ease of description, and thus the present disclosure is not limited thereto. Throughout the written description and drawings, like reference numbers and labels will be used to denote like or similar elements. It will also be understood that when an element such as a layer, a film, a region or a component is referred to as being "on" another layer or element, it can be "directly on" the other layer or element, or intervening layers, regions, or components may also be present. In contrast, when an element is referred to as being "directly on" another element, there are no intervening elements present. Although the terms "first", "second", etc., may be used herein to describe various elements, components, regions, and/or layers, these elements, components, regions, and/or layers should not be limited by these terms. These terms are used only to distinguish one component from another, not for purposes of limitation. In the following description and drawings, constituent elements having substantially the same functional constitutions are assigned like reference numerals, and overlapping descriptions will be omitted.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, the term "percent" or "%" when used to represent the proportion of a $PS_4^{3-}$ unit, a $P_2S_6^{4-}$ unit, and/or a $P_2S_7^{4-}$ unit with respect to a total proportion of the $PS_4^{3-}$ unit, $P_2S_6^{4-}$ unit and $P_2S_7^{4-}$ unit refers to "mole percent" or "mole %." Similarly, the "proportion" of a $PS_4^{3-}$ unit, a $P_2S_6^{4-}$ unit, and/or a $P_2S_7^{4-}$ unit with respect to a total proportion of the $PS_4^{3-}$ unit, $P_2S_6^{4-}$ unit and $P_2S_7^{4-}$ unit, refers to the "molar amount" of a $PS_4^{3-}$ unit, a $P_2S_6^{4-}$ unit, and/or a $P_2S_7^{4-}$ unit with respect to a total proportion of the $PS_4^{3-}$ unit, $P_2S_6^{4-}$ unit and $P_2S_7^{4-}$ unit, and the terms are used interchangeably herein.

Hereinafter, embodiments of a sulfide (e.g., sulfide-based, sulfide-containing) solid electrolyte, an all-solid secondary battery including the sulfide-based solid electrolyte, and a method of preparing the sulfide-based solid electrolyte will be described in detail.

According to an aspect of the disclosure, a sulfide-based solid electrolyte includes: an ionic conductor including a $PS_4^{3-}$ unit, a $P_2S_6^{4-}$ unit, and a $P_2S_7^{4-}$ unit; and a lithium compound containing a halogen element, wherein a molar ratio ($P_2S_6^{4-}/PS_4^{3-}$) of the $P_2S_6^{4-}$ unit to the $PS_4^{3-}$ unit may be about 1:1 or greater, and a molar amount of the $P_2S_7^{4-}$ unit with respect to a total molar amount of the $PS_4^{3-}$ unit, the $P_2S_6^{4-}$ unit, and the $P_2S_7^{4-}$ unit may be about 60% or less. Since the ionic conductor included in the sulfide-based solid electrolyte satisfies the above-described relationship of the $PS_4^{3-}$ unit, the $P_2S_6^{4-}$ unit and the $P_2S_7^{4-}$ unit, the sulfide-based solid electrolyte may have excellent ionic conductivity and improved stability with respect to lithium metal. Accordingly, during charge and discharge of an all-solid secondary battery, a side reaction between the sulfide-based solid electrolyte and lithium metal may be suppressed, and cycle characteristics of the all-solid secondary battery including the sulfide-based solid electrolyte and a lithium metal anode may have improved cycle characteristics. When the molar ratio of the $P_2S_6^{4-}$ unit to the $PS_4^{3-}$ unit is less than 1:1, i.e., when a fraction of the $P_2S_6^{4-}$ unit is less than a fraction of the $PS_4^{3-}$ unit, the sulfide-based solid electrolyte may have reduced stability with respect to lithium metal. When the proportion of the $P_2S_7^{4-}$ unit with respect to the total proportion of the $PS_4^{3-}$ unit, the $P_2S_6^{4-}$ unit and the $P_2S_7^{4-}$ unit exceeds 60%, the sulfide-based solid electrolyte may have increased ionic conductivity, but also increased reactivity with respect to lithium metal.

In an embodiment, the molar ratio of the $P_2S_6^{4-}$ unit to the $PS_4^{3-}$ unit in the sulfide-based solid electrolyte may be, for example, about 1.2:1 or greater, about 1.4:1 or greater, about 1.6:1 or greater, about 1.8:1 or greater, or about 2:1 or greater. For example, the molar ratio of the $P_2S_6^{4-}$ unit to the $PS_4^{3-}$ unit in the sulfide-based solid electrolyte may be about 1:1 to about 5:1, about 1.2:1 to about 4:1, about 1.4:1 to about 3:1, about 1.6:1 to 3:1, about 1.8:1 to about 3:1, about 2:1 to 5:1, or about 2:1 to about 3:1.

In an embodiment, the proportion of the $P_2S_7^{4-}$ unit in the sulfide-based solid electrolyte may be about 60% or less, about 55% or less, about 50% or less, about 45% or less, about 40% or less, or about 35% or less, based on the total proportion of the $PS_4^{3-}$ unit, the $P_2S_6^{4-}$ unit and the $P_2S_7^{4-}$ unit. For example, the molar amount (proportion) of the $P_2S_7^{4-}$ unit with respect to the total molar amount of the $PS_4^{3-}$ unit, the $P_2S_6^{4-}$ unit, and the $P_2S_7^{4-}$ unit may be greater than 0 and not more than 55%, greater than 0 and not more than 50%, greater than 0 and not more than 45%, greater than 0 and not more than 40%, or greater than 0 and not more than 35%. When the ion composition of the sulfide-based solid electrolyte is within the above ranges, the sulfide-based solid electrolyte may have suppressed reactivity with respect to lithium metal.

In the sulfide-based solid electrolyte according to an embodiment, the molar amount of the $PS_4^{3-}$ unit may be about 5% to about 30%, or about 7% to about 28%, or about 10 to about 25% with respect to the total molar amount of the $PS_4^{3-}$ unit, the $P_2S_6^{4-}$ unit, and the $P_2S_7^{4-}$ unit; the molar amount of the $P_2S_6^{4-}$ unit may be about 40% to about 80%, or about 45% to about 75%, or about 50% to about 65%, with respect to the total molar amount of the $PS_4^{3-}$ unit, the $P_2S_6^{4-}$ unit, and the $P_2S_7^{4-}$ unit; and the molar amount of the $P_2S_7^{4-}$ unit may be greater than 0 to about 40%, or greater than 0 to about 30%, or greater than 0 to about 25%, with respect to the total molar amount of the $PS_4^{3-}$ unit, the $P_2S_6^{4-}$ unit, and the $P_2S_7^{4-}$ unit. When the ion composition of the sulfide-based solid electrolyte is within the above ranges, the reactivity of the sulfide-based solid electrolyte with respect to lithium metal may be further suppressed.

In the sulfide-based solid electrolyte according to an embodiment, the proportion of the $P_2S_7^{4-}$ unit may be greater than the proportion of the $PS_4^{3-}$ unit. Due to the greater proportion of the $P_2S_7^{4-}$ unit than the $PS_4^{3-}$ unit in the sulfide-based solid electrolyte, the sulfide-based solid electrolyte may have improved ionic conductivity.

The ionic conductor included in the sulfide-based solid electrolyte may include, for example, $Li_3PS_4$, $Li_4P_2S_6$, and $Li_7P_3S_{11}$. For example, $Li_4PS_4$ may be a first ionic conductor including the $PS_4^{3-}$ unit. For example, $Li_4P_2S_6$ may be a second ionic conductor including the $P_2S_6^{4-}$ unit. For example, $Li_7P_3S_{11}$ may be a third ionic conductor including the $P_2S_7^{4-}$ unit. Accordingly, the ionic conductor included in the sulfide-based solid electrolyte may include the first ionic conductor, the second ionic conductor, and the third ionic conductor. The $Li_4PS_4$, $Li_4P_2S_6$ and $Li_7P_3S_{11}$ included in the ionic conductor may be, each independently, amorphous or crystalline.

The $Li_4PS_4$, $Li_4P_2S_6$, and $Li_7P_3S_{11}$ included in the ionic conductor may each be a crystalline compound. An X-ray diffraction spectrum (XRD) of the sulfide-based solid electrolyte may exhibit a first peak corresponding to $Li_7P_3S_{11}$ at a diffraction angle degrees 2-theta (2θ) of 29.8°±0.5° and a second peak corresponding to $Li_4P_2S_6$ at a diffraction angle degrees 2θ of 32.5°±0.5°. For example, the sulfide-based solid electrolyte may be a solid electrolyte glass ceramic in which a crystalline phase is dispersed in an amorphous matrix.

In other embodiments, the $Li_4P_2S_6$, $Li_4P_2S_6$ and $Li_7P_3S_{11}$ included in the ionic conductor may be an amorphous compound having an amorphous phase. In the XRD spectrum of the sulfide-based solid electrolyte, a crystalline peak may appear weak or may be substantially not detected. The sulfide-based solid electrolyte may be, for example, a solid electrolyte glass. A solid electrolyte glass and a solid electrolyte glass ceramic are distinguished from a crystalline solid electrolyte. A crystalline solid electrolyte does not include an amorphous phase or may include 10 volume percent (vol %) or less, 5 vol % or less, or 1 vol % or less of an amorphous phase with respect to a total volume of the solid electrolyte.

In an embodiment, the sulfide-based solid electrolyte may include a lithium compound containing a halogen element, wherein the lithium compound may include, for example, a lithium halide. The halogen element included in the sulfide-based solid electrolyte may originate from a lithium halide. For example, the halogen element may be present as a halide ion in the sulfide-based solid electrolyte. The lithium halide may be, for example, LiCl, LiI, LiF, or LiBr. For example, the lithium halide may be LiCl. Since the sulfide-based solid electrolyte includes a lithium halide, the composition of the $PS_4^{3-}$ unit, the $P_2S_6^{4-}$ unit and the $P_2S_7^{4-}$ unit in the sulfide-based solid electrolyte may be significantly different from that in a sulfide-based solid electrolyte containing no lithium halide. For example, a sulfide-based solid electrolyte (e.g., Comparative Example 1) containing no lithium halide may not include the $P_2S_6^{4-}$ unit, as shown in Table 3.

An amount of the lithium halide in the sulfide-based solid electrolyte may be about 3 weight percent (wt %) to about 22 wt %, about 5 wt % to about 20 wt %, about 5.5 wt % to about 15 wt %, about 6 wt % to about 12 wt %, or about 6.5 wt % to about 10 wt %, based on a total weight of the sulfide-based solid electrolyte. When the amount of the sulfide-based solid electrolyte is within the above ranges, the sulfide-based solid electrolyte may have both improved ionic conductivity and improved stability with respect to lithium metal. When the amount of the lithium halide is excessively increased, the ionic conductivity of the sulfide-based solid electrolyte may be reduced. When the amount of the lithium halide is too low, the sulfide-based solid electrolyte may have poor stability with respect to lithium metal.

The sulfide-based solid electrolyte may be formed by using a mixture including a starting material composition including the elements P, S, and Li, and a lithium compound containing a halogen element. That is, the sulfide-based solid electrolyte may be obtained from a mixture of a starting material composition including the elements P, S, and Li, and a lithium compound containing a halogen element. For example, the starting material composition may include $Li_2S$ and $P_2S_5$, and the lithium compound may include a lithium halide. In the starting material composition, a molar ratio of $Li_2S$ to $P_2S_5$ ($Li_2S:P_2S_5$) may be about 50:50 (1:1) to about 90:10 (9:1), about 55:45 to about 85:15, about 60:40 to about 80:20, or about 65:35 to about 80:20. When the ratio of $Li_2S$ to $P_2S_5$ is within the above ratios, the sulfide-based solid electrolyte may have excellent ionic conductivity and improved stability with respect to lithium metal.

An amount of the lithium compound may be about 3 wt % to about 22 wt %, about 5 wt % to about 20 wt %, about 5.5 wt % to about 15 wt %, about 6 wt % to about 12 wt %, or about 6.5 wt % to about 10 wt %, each based on a total weight of the starting material composition and the lithium compound. When the amount of the lithium compound in the mixture of the starting material composition and the lithium compound is within the above ranges, the sulfide-based solid electrolyte may have both excellent ionic conductivity and improved stability with respect to lithium metal at the same time. When the amount of the lithium halide is excessively increased, the ionic conductivity of the sulfide-based solid electrolyte may be reduced. When the amount of the lithium halide is too low, the sulfide-based solid electrolyte may have poor stability with respect to lithium metal. The lithium compound may be, for example, a lithium halide.

For example, the sulfide-based solid electrolyte may be obtained by providing a mixture including the starting material composition and the lithium compound, milling the mixture to provide a solid electrolyte precursor, and then thermally treating the solid electrolyte precursor to prepare the sulfide solid electrolyte. For example, the thermal treatment temperature may be about 350° C. or less, about 340° C. or less, about 330° C. or less, about 320° C. or less, about 310° C. or less, or about 300° C. or less. The thermal treatment temperature may be, for example, about 100° C. to about 350° C., about 100 to about 340° C., about 100 to about 330° C., about 100 to about 320° C., about 100 to about 310° C., or about 100 to about 300° C. When the thermal treatment temperature is too high, due to progression of crystallization, a crystalline sulfide-based solid electrolyte may be obtained. When the thermal treatment temperature is too low, the sulfide-based solid electrolyte may have reduced stability with respect to lithium metal. The reaction of the starting material composition with the lithium compound may be, for example, an amorphization reaction.

The sulfide-based solid electrolyte may have an elastic modulus which is less than an elastic modulus of a crystalline argyrodite-type solid electrolyte. Since the sulfide-based solid electrolyte has a smaller elastic modulus as compared with the argyrodite-type solid electrolyte, the temperature and/or pressure used to sinter (thermally treat) the reaction mixture may be reduced, and as a result, it may be easier to sinter the sulfide-based solid electrolyte. For example, the sulfide-based solid electrolyte may have an elastic modulus (i.e., Young's modulus) of about 30 gigapascals (GPa) or less, about 27 GPa or less, about 25 GPa or less, or about 23 GPa or less. For example, the sulfide-based solid electrolyte may have an elastic modulus of about 10 to about 30 GPa, about 10 to about 27 GPa, about 10 to about 25 GPa, or about 10 to about 23 GPa. When the sulfide-based solid electrolyte has an elastic modulus within the above ranges, sintering of the sulfide-based solid electrolyte may be facilitated.

The crystalline argyrodite-type solid electrolyte is a crystalline solid electrolyte having a composition represented by Formula 1. The crystalline argyrodite-type solid electrolyte is obtained by thermal treatment at a high temperature of 550° C. or greater.

$$Li^+{}_{12-n-x}A^{n+}X^{2-}{}_{6-x}Y^-{}_x \qquad \text{Formula 1}$$

In Formula 1, A is P, As, Ge, Ga, Sb, Si, Sn, Al, In, Ti, V, Nb, or Ta; X is S, Se or Te; Y is Cl, Br, I, F, CN, OCN, SCN, or $N_3$; and $0 \le x \le 2$.

For example, the crystalline argyrodite-type solid electrolyte may include $Li_{7-x}PS_{6-x}Cl_x$ (wherein $0 \le x \le 2$), $Li_{7-x}PS_{6-x}Br_x$ (wherein $0 \le x \le 2$), $Li_{7-x}PS_{6-x}I_x$ (wherein $0 \le x \le 2$), or a combination thereof. For example, the crystalline argyrodite-type solid electrolyte may include $Li_6PS_5Cl$, $Li_6PS_5Br$, $Li_6PS_5I$, or a combination thereof. The crystalline argyrodite-type solid electrolyte may have an elastic modulus of 30 GPa or greater.

For example, the sulfide-based solid electrolyte may have an ionic conductivity at 25° C. of about $1 \times 10^{-3}$ Siemens per centimeter (S/cm) or greater, about $1.3 \times 10^{-3}$ S/cm or greater, about $1.6 \times 10^{-3}$ S/cm or greater, or about $1.0 \times 10^{-3}$ S/cm or greater, or about $1 \times 10^{-3}$ to about $1 \times 10^{-1}$ S/cm, or about $1 \times 10^{-3}$ to about $1 \times 10^{-2}$ S/cm, or about $1 \times 10^{-3}$ to about $2 \times 10^{-3}$ S/cm. Since the sulfide-based solid electrolyte has a high ionic conductivity of $1 \times 10^{-3}$ Siemens per centimeter or greater, the sulfide-based solid electrolyte may be effectively used as an electrolyte for an all-solid secondary battery.

For example, the sulfide-based solid electrolyte may have an activation energy of about 40 kilojoules per mole (kJ/mol) or less, or about 35 kJ/mol or less, and in some other embodiments, about 30 kJ/mol to about 40 kJ/mol. When the sulfide-based solid electrolyte has an activation energy within the above ranges, the temperature dependence of ionic conductivity may be reduced, and it may be possible to prevent a reduction in ionic conductivity in a low-temperature temperature range.

For example, ionic conductivity measurement and activation energy calculation of the sulfide-based solid electrolyte may be performed using the following method. For example, after the sulfide-based solid electrolyte is ground using an agate mortar, the ground sulfide-based sulfide electrolyte may be pressed under a pressure of about 400 megapascals per square centimeter (MPa/cm²) to thereby form pellets. Then, an indium (In) foil having a thickness of about 50 micrometers (μm) was attached to opposite sides of each pellet, so as to measure an alternating current (AC) impedance thereof, and an ionic conductivity thereof was derived from the measured AC impedance. Based on the measured ionic conductivity, the activation energy of the sulfide-based solid electrolyte may be calculated using the Arrhenius formula represented by Equation 1.

$$\sigma=(\sigma_0/T)\exp(-Ea/kT) \qquad \text{Equation 1}$$

In Equation 1, σ is ionic conductivity, $\sigma^0$ is the pre-exponential factor, T is temperature in Kelvin (K), Ea is the activation energy for ion conduction; and k is the Boltzmann constant.

According to another aspect of the disclosure, an all-solid secondary battery includes: a cathode layer; an anode layer; and a solid electrolyte layer disposed between the cathode layer and the anode layer, wherein the solid electrolyte layer includes the sulfide-based solid electrolyte according to any one of the above-described embodiments. Since the solid electrolyte layer includes the solid electrolyte according to any of the embodiments, a side reaction between the solid electrolyte layer and lithium metal included in the anode layer may be suppressed, and the all-solid secondary battery may have improved cycle characteristics.

Figure 9:
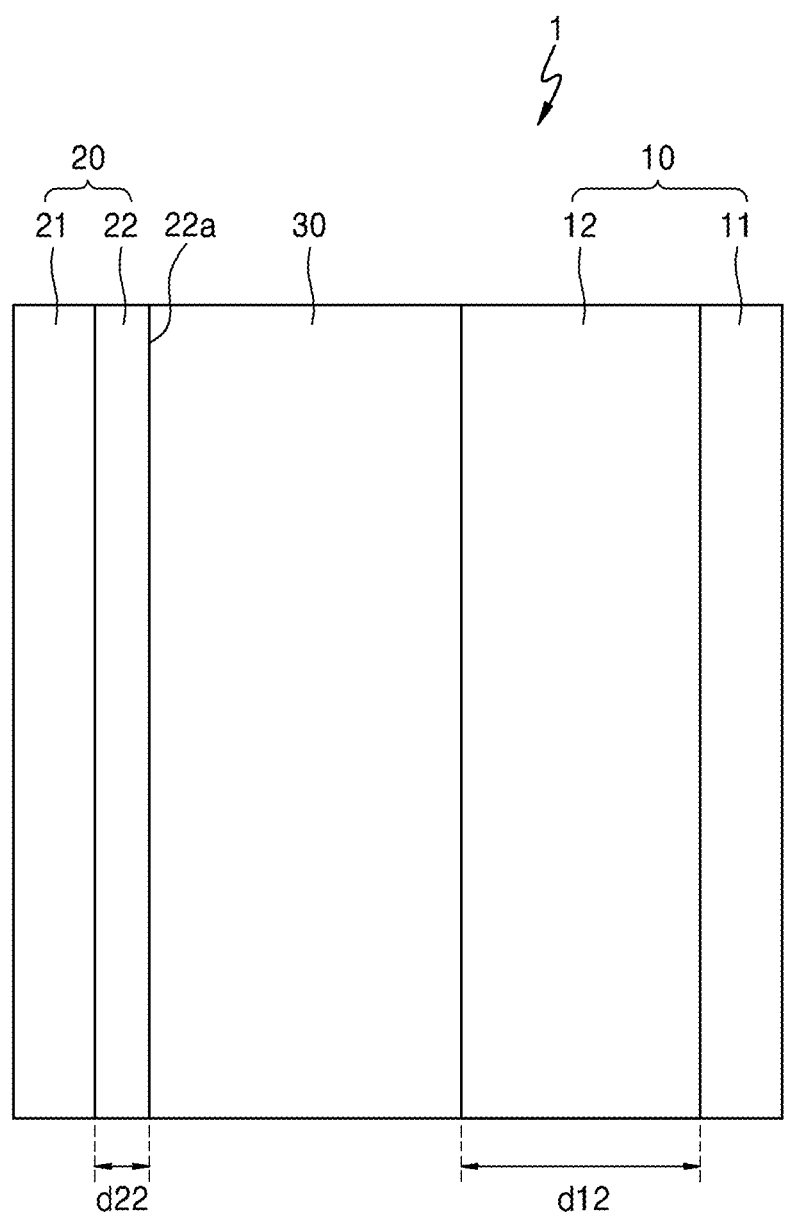
FIG. 9 is a cross-sectional view of an all-solid secondary battery according to an embodiment.
Figure 10:
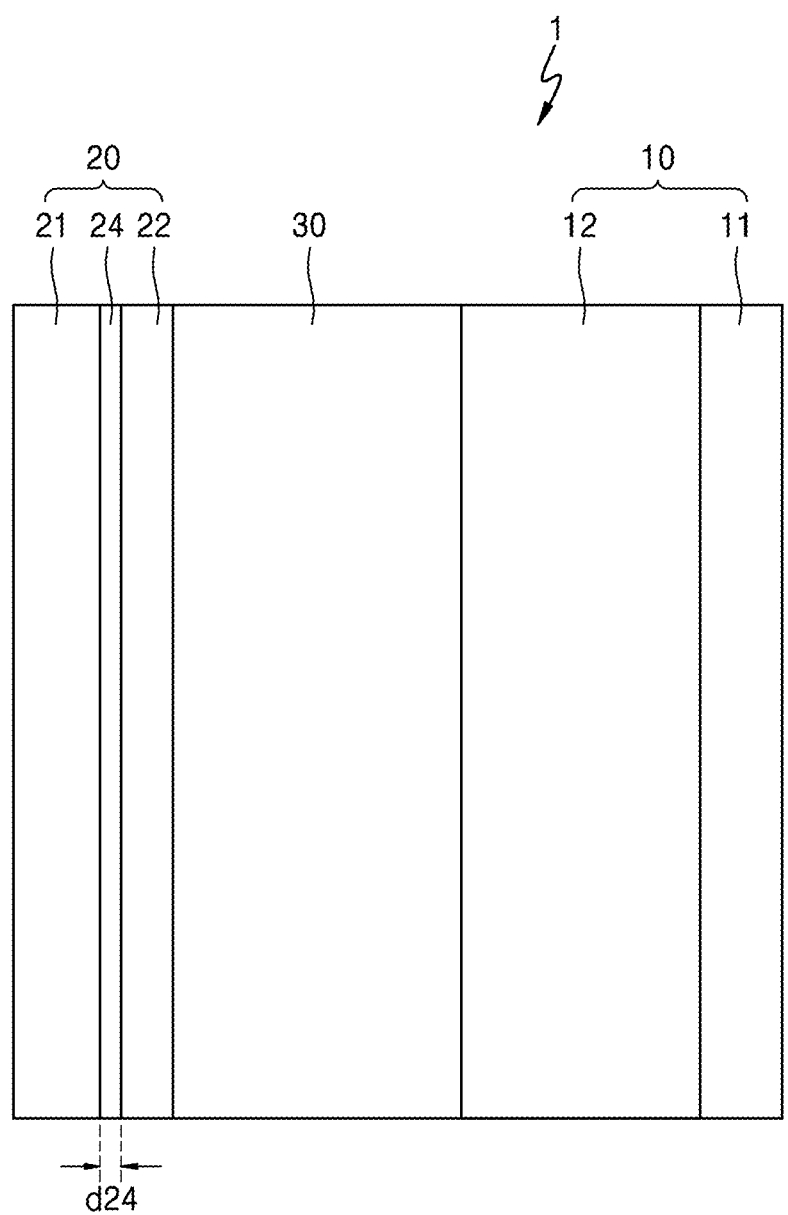
FIG. 10 is a cross-sectional view of an all-solid secondary battery according to another embodiment.
Figure 11:
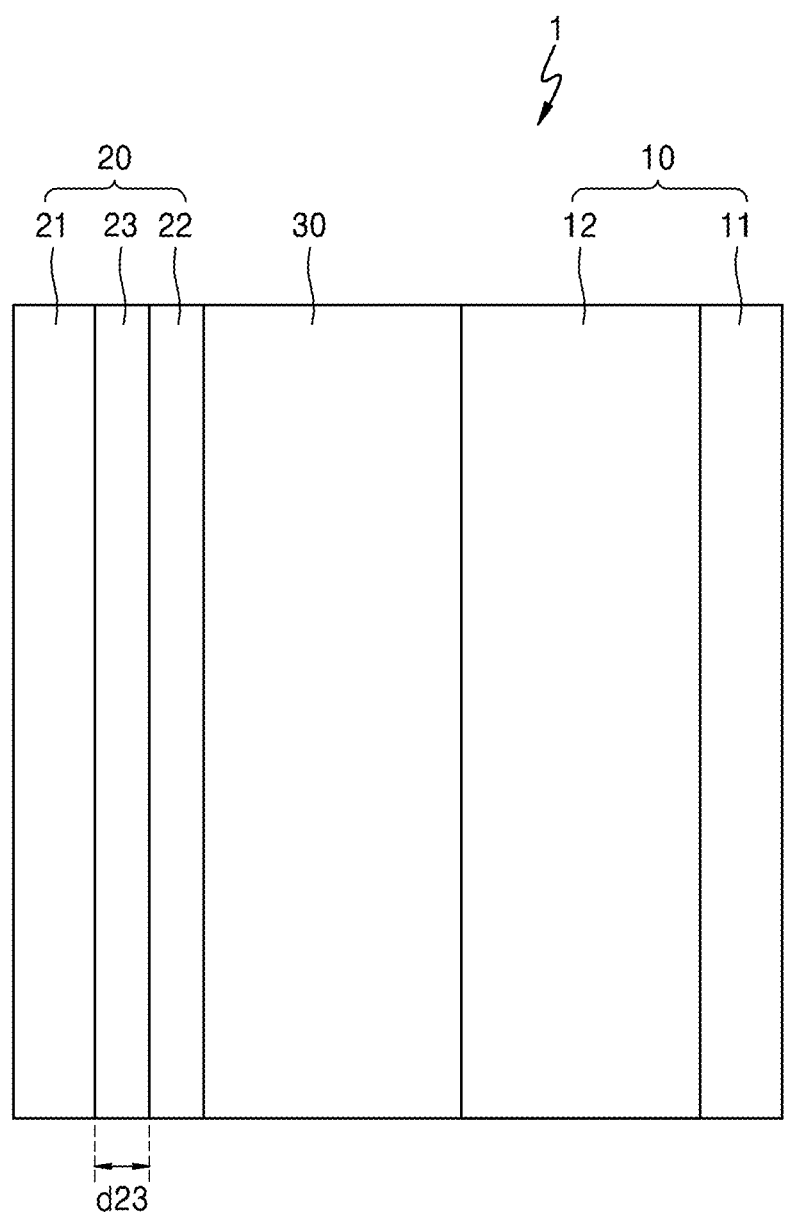
FIG. 11 is a cross-sectional view of an all-solid secondary battery according to an embodiment.

Referring to FIGS. 9 to 11, an all-solid secondary battery 1 according to an embodiment may include: an anode layer 20 including an anode current collector layer 21 and a first anode active material layer 22; a cathode layer 10 including a cathode active material layer 12; and a solid electrolyte layer 30 disposed between the anode layer 20 and the cathode layer 10.

(Anode Layer)

Referring to FIGS. 9 to 11, the anode layer 20 may include the anode current collector layer 21 and the first anode active material layer 22. The first anode active material layer 22 may include an anode active material.

The anode active material of the first anode active material layer 22 may be, for example, in the form of particles. For example, the anode active material in the form of particles may have an average particle diameter of 4 um or less, about 3 um or less, about 2 um or less, about 1 um or less, or about 900 nm or less. For example, the anode active material in the form of particles may have an average particle diameter of about 10 nanometers (nm) to about 4 um, about 10 nm to about 3 um, about 10 nm to about 2 um, about 10 nm to about 1 um, or about 10 nm to about 900 nm. When the anode active material has an average particle diameter within these ranges, reversible absorption and/or desorption of lithium during charge and discharge may be further facilitated. The average particle diameter of the anode active material may be a median diameter (D50) as measured by, for example, a laser-diffraction particle size distribution analyzer.

For example, the anode active material of the first anode active material layer 22 may further include at a carbonaceous anode active material, a metal or metalloid anode active material, or a combination thereof.

The carbonaceous anode active material may be, for example, amorphous carbon. For example, the amorphous carbon may be carbon black (CB), acetylene black (AB), furnace black (FB), ketjen black (KB), graphene, or a combination thereof. However, embodiments are not limited thereto. Any amorphous carbon suitable for use in an all-solid secondary battery may be used. The amorphous carbon refers to carbon without crystallinity or with very low crystallinity, and is distinguished from crystalline carbon or graphitic carbon.

The metal or metalloid anode active material may include gold (Au), platinum (Pt), palladium (Pd), silicon (Si), silver (Ag), aluminum (Al), bismuth (Bi), tin (Sn), zinc (Zn), or a combination thereof. However, embodiments are not limited thereto. Any metal anode active material or metalloid anode active material capable of forming an alloy or compound with lithium may be used. For example, nickel (Ni), which does not form an alloy with lithium, may not be used as the metal anode active material.

The first anode active material layer 22 may include one of the above-listed anode active materials or a mixture of the multiple anode active materials described above. For example, the first anode active material layer 22 may include only amorphous carbon alone, or may include gold (Au), platinum (Pt), palladium (Pd), silicon (Si), silver (Ag), aluminum (Al), bismuth (Bi), tin (Sn), zinc (Zn), or a combination thereof. In an embodiment, the first anode active material layer 22 may include a mixture of amorphous carbon and at least one of gold (Au), platinum (Pt), palladium (Pd), silicon (Si), silver (Ag), aluminum (Al), bismuth (Bi), tin (Sn), or zinc (Zn). In a mixture of amorphous carbon and, for example, gold (Au), a mixed ratio of the amorphous carbon to gold (Au) may be, for example, about 10:1 to about 1:2, about 5:1 to about 1:1, or about 4:1 to about 2:1. However, embodiments are not limited thereto. The mixed ratio may be appropriately chosen according to desired characteristics of the all-solid secondary battery 1. Since the anode active material of the first anode active material layer 22 has a composition as described above, the all-solid secondary battery 1 may have further improved cycle characteristics.

The anode active material of the first anode active material layer 22 may include a mixture of first particles consisting of amorphous carbon and second particles consisting of a metal or metalloid. Examples of the metal or metalloid may be gold (Au), platinum (Pt), palladium (Pd), silicon (Si), silver (Ag), aluminum (Al), bismuth (Bi), tin (Sn), zinc (Zn), or a combination thereof. For example, the metalloid may be a semiconductor. The amount of the second particles may be about 8 wt % to about 60 wt %, about 10 wt % to about 50 wt %, about 15 wt % to about 40 wt %, or about 20 wt % to about 30 wt %, based on a total weight of the mixture. When the amount of the second particles is within these ranges, the all-solid secondary battery 1 may have further improved cycle characteristics.

The first anode active material layer 22 may include, for example, a binder. The binder may be, for example, a styrene-butadiene rubber (SBR), polytetrafluoroethylene (PTFE), polyvinylidene fluoride (PVDF), polyethylene, a vinylidene fluoride/hexafluoropropylene copolymer, a hexafluoropropylene copolymer, polyacrylonitrile, or polymethylmethacrylate. A combination comprising at least one of the foregoing binders may also be used. However, embodiments are not limited thereto. Any suitable binder may be used. The binder may be one binder or include a plurality of different binders.

By the inclusion of the binder, the first anode active material layer 22 may be stabilized on the anode current collector 21. In addition, cracking of the first anode active material layer 22 may be suppressed in spite of volume change and/or relative position change of the first anode active material layer 22 during charge and discharge processes. For example, when the first anode active material layer 22 does not include a binder, the first anode active material layer 22 may be easily separated from the anode current collector 21. When a portion of the first anode active material layer 22 is separated from the anode current collector 21, the anode current collector 21 may be partially exposed and may contact the solid electrolyte layer 30, and accordingly, a short-circuit may be more likely to occur. For example, the first anode active material layer 22 may be formed by coating, on the anode current collector 21, a slurry in which ingredients of the first anode active material layer 22 are dispersed, and then drying the resulting product. By inclusion of the binder in the first anode active material layer 22, the anode active material may be stably dispersed in the slurry. For example, when the slurry is coated on the anode current collector 21, for example by screen printing, clogging of the screen (for example, clogging by aggregates of the anode active material) may be suppressed.

For example, a thickness d22 of the first anode active material layer 22 may be about 50% or less, about 40% or less, about 30% or less, about 20% or less, about 10% or less, or about 5% or less, based on a total thickness of the anode layer 20. For example, the thickness d22 of the first anode active material layer 22 may be about 1 μm to about 20 μm, about 2 μm to about 10 μm, or about 3 μm to about 7 μm. When the thickness d22 of the first anode active material layer 22 is too thin, the first anode active material layer 22 may be disintegrated by lithium dendrites which are generated between the first anode active material layer 22 and the anode current collector 21, and which may deteriorate cycle characteristics of the all-solid secondary battery 1. When the thickness d22 of the first anode active material layer 22 is too thick, the all-solid secondary battery 1 may have a reduced energy density, an increased internal resistance, and thus poor cycle characteristics.

When the thickness d22 of the first anode active material layer 22 is reduced, for example, the first anode active material layer 22 may have a reduced charge capacity. For example, a charge capacity of the first anode active material layer 22 may be about 50% or less, about 40% or less, about 30% or less, about 20% or less, about 10% or less, about 5% or less, or about 2% or less of a charge capacity of the cathode active material layer 12. For example, a charge capacity of the first anode active material layer 22 may be about 0.1% to about 50%, about 0.1% to about 40%, about 0.1% to about 30%, about 0.1% to about 20%, about 0.1% to about 10%, about 0.1% to about 5%, or about 0.1% to about 2% of a charge capacity of the cathode active material layer 12. When the charge capacity of the first anode active material layer 22 is too small, the thickness of the first anode active material layer 22 may become so thin that the first anode active layer 22 may be disintegrated by lithium dendrites which are formed between the first anode active material layer 22 and the anode current collector during repeated charge and discharge processes, and consequently the all-solid secondary battery 1 may have poor cycle characteristics. When the charge capacity of the first anode active material layer 22 is excessively increased, the all-solid secondary battery 1 may have a reduced energy density, an increased internal resistance, and thus poor cycle characteristics.

The charge capacity of the cathode active material layer 12 may be obtained by multiplying a charge capacity density (milliampere hours per gram, mAh/g) of a cathode active material in the cathode active material layer 12 by a mass of the cathode active material. When different cathode active materials are used, a charge capacity density of each of the cathode active material layers may be multiplied by a mass thereof, and then the sum of the multiplication products may be calculated as the charge capacity of the cathode active material layer 12. The charge capacity of the first anode active material layer 22 may be calculated in the same manner. That is, the charge capacity of the first anode active material layer 22 may be obtained by multiplying a charge capacity density of an anode active material in the first anode active material layer 22 by a mass of the anode active material. When a plurality of different anode active materials are used, a charge capacity density of each of the anode active material layers may be multiplied by a mass thereof, and then the sum of the multiplication products may be calculated as the charge capacity of the first anode active material layer 22. The charge capacity densities of the cathode active material and the anode active material are estimated capacities obtained with an all-solid half-cell including lithium metal as a counter electrode. The charge capacities of the cathode active material layer 12 and the first anode active material layer 22 may be directly calculated using an all-solid half-cell. The measured charge capacity of each of the cathode and anode active materials may be divided by a mass of the corresponding active material to thereby obtain the charge capacity density of the active material. In an embodiment, the charge capacities of the cathode active material layer 12 and the first anode active material layer 22 may be initial charge capacities measured after $1^{st}$ cycle charging.

For example, the anode current collector 21 may consist essentially of or consist of a material which does not react with lithium to form an alloy or compound. The material of the anode current collector 21 may be, for example, copper (Cu), stainless steel, titanium (Ti), iron (Fe), cobalt (Co), nickel (Ni), or a combination thereof. However, embodiments are not limited thereto. Any material available in the art as an anode current collector may be used. The anode current collector 21 may include one of the above-listed metals, an alloy thereof, a coated material of two or more of the above-listed metals, or a combination thereof. The anode current collector 12 may be, for example, in the form of a plate or a foil.

The first anode active material layer 22 of the all-solid secondary battery 1 may further include any additive(s) suitable for use in an anode active material layer of an all-solid secondary battery. Examples of such additives include a filler, a dispersing agent, an ionic conducting agent, or a combination thereof, but are not limited thereto.

Referring to FIG. 10, in another embodiment, the all-solid secondary battery 1 may further include a thin film 24 on the anode current collector 21, the thin film 24 including an element alloyable with lithium. The thin film 24 may be disposed between the anode current collector 21 and the first anode active material layer 22. The thin film 24 may include, for example, an element alloyable with lithium. The element alloyable with lithium may be, for example, gold (Au), silver (Ag), zinc (Zn), tin (Sn), indium (In), silicon (Si), aluminum (Al), bismuth (Bi), magnesium (Mg), antimony (Sb), or a combination thereof. However, embodiments are not limited thereto. Any element which may form an alloy with lithium may be used. The thin film 24 may consist essentially of or consist of one of the above-listed metals or an alloy of two or more of the metals. Due to the disposition of the thin film 24 on the anode current collector 21, for example, a second anode active layer (not shown) disposed between the thin film 24 and the first anode active material layer 22 may be further planarized, further improving cycle characteristics of the all-solid secondary battery 1.

A thickness d24 of the thin film 24 may be, for example, about 1 nm to about 800 nm, about 10 nm to about 700 nm, about 50 nm to about 600 nm, or about 100 nm to about 500 nm. When the thickness d24 of the thin film 24 is less than 1 nm, the thin film 24 may not exhibit its predetermined function. When the thickness d24 of the thin film 24 is too thick, the thin film 24 itself may absorb lithium, such that precipitation of lithium on the anode may be reduced, which may consequently lower the energy density of the all-solid secondary battery 1 and deteriorate the cycle characteristics thereof. The thin film 24 may be formed on the anode current collector by using, for example, a vapor deposition method, a sputtering method, a plating method, or a combination thereof. However, embodiments are not limited thereto. Any suitable method capable of forming the thin film 12 may be used.

Referring to FIG. 11, in another embodiment, the all-solid secondary battery 1 may further include a second anode active material layer 23 between the anode current collector 21 and the solid electrolyte layer 30. For example, the all-solid secondary battery 1 may further include the second anode active material layer 23 disposed between the anode current collector 21 and the first anode active material layer 22, through charging. In an embodiment, although not illustrated, the all-solid secondary battery 1 may further include a second anode active material layer disposed between the solid electrolyte layer 30 and the first anode active material layer 22 through charging. In an embodiment, although not illustrated, the all-solid secondary battery 1 may further include a second anode active material layer deposited within the first anode active layer 22 through charging.

The second anode active material layer 23 may be a metal layer including lithium or a lithium alloy. Since the second anode active material layer 23 is a metal layer including lithium or a lithium alloy, the second anode active material layer 23 may function, for example, as a lithium reservoir. The lithium alloy may be, for example, a Li—Al alloy, a Li—Sn alloy, a Li—In alloy, a Li—Ag alloy, a Li—Au alloy, a Li—Zn alloy, a Li—Ge alloy, a Li—Si alloy, or a combination thereof. However, embodiments are not limited thereto. Any lithium alloy may be used. The second anode active material layer 23 may include lithium, a single lithium alloy, or a plurality of different alloys, or a combination thereof.

A thickness d23 of the second anode active material layer 23 is not specifically limited. For example, the thickness d23 of the second anode active material layer 23 may be about 1 μm to about 1,000 μm, about 1 μm to about 500 μm, about 1 μm to about 200 μm, about 1 μm to about 150 μm, about 1 μm to about 100 μm, or about 1 μm to about 50 μm. When the thickness d23 of the second anode active material layer 23 is too thin, the second anode active material layer 23 may not appropriately function as a lithium reservoir. When the thickness d23 of the second anode active material layer 23 is too thick, the mass and volume of the all-solid secondary battery 1 may be increased, further deteriorating cycle characteristics. The second anode active material layer 23 may be, for example, a metal foil having a thickness within these ranges.

The second anode active material layer 23 of the all-solid secondary battery 1 may, for example, be disposed between the anode current collector 21 and the first anode active material layer 22 prior to the assembly of the all-solid secondary battery 1, or may be precipitated between the anode current collector 21 and the first anode active material layer 22 by charging after assembly of the all-solid secondary battery 1.

When the second anode active material layer 23 is disposed between the anode current collector 21 and the first anode active material layer 22 prior to the assembly of the all-solid secondary battery, the second anode active material layer 23, as a metal layer including lithium, may function as a lithium reservoir. The all-solid secondary battery 1 including the second anode active material layer 23 may have further improved cycle characteristics. For example, a lithium foil as the second anode active material layer 23 may be disposed between the anode current collector 21 and the first anode active material layer 22 before assembly of the all-solid secondary battery 1.

When the second active material layer 23 is deposited by charging after assembly of the all-solid secondary battery 1, the all-solid secondary battery 1 may have an increased energy density since the second anode active material layer 23 is not present during the assembly of the all-solid secondary battery 1. For example, the all-solid secondary battery 1 may be charged until a charge capacity of the first anode active material layer 22 is exceeded. That is, the first anode active material layer 22 may be overcharged. At an initial charging stage, lithium may be absorbed into the first anode active material layer 22. That is, the anode active material in the first anode active material layer 22 may form an alloy or compound with lithium ions which have moved from the cathode layer 10. When the all-solid secondary batter 1 is charged over the capacity of the first anode active material layer 22, for example, lithium may be precipitated on a rear surface of the first anode active material layer 22, i.e., between the anode current collector 21 and the first anode active material layer 22, thus forming a metal layer corresponding to the second anode active material layer 23.

The second anode active material layer 23 may be a metal layer including lithium (i.e., metal lithium) as a major component. Without being limited by theory, it is understood that this may be attributed to, for example, the fact that the anode active material in the first anode active material layer 22 includes a material capable of forming an alloy or compound with lithium. During discharge, lithium in the first anode active material layer 22 and the second anode active material layer 23, i.e., lithium metal layer, may be ionized and then move towards the cathode layer 10. Accordingly, the all-solid secondary battery 1 may use lithium as the anode active material. Since the first anode active material layer 22 coats the second anode active material layer 23, the first anode active material layer 22 may function as a protective layer of the second anode active material layer 23 and at the same time suppress precipitation and growth of a lithium dendrite. Accordingly, a short-circuit and reduction in capacity of the all-solid secondary battery 1 may be suppressed, and consequently cycle characteristics of the all-solid secondary battery 1 may be improved. When the second anode active layer 23 is disposed through charging after assembly of the all-solid secondary battery 1, the anode current collector 21, the first anode active material layer 22, and a region therebetween may be, for example, Li-free regions which do not include lithium (Li) metal or a Li alloy in an initial state or a post-discharge state of the all-solid secondary battery.

Figure 12:
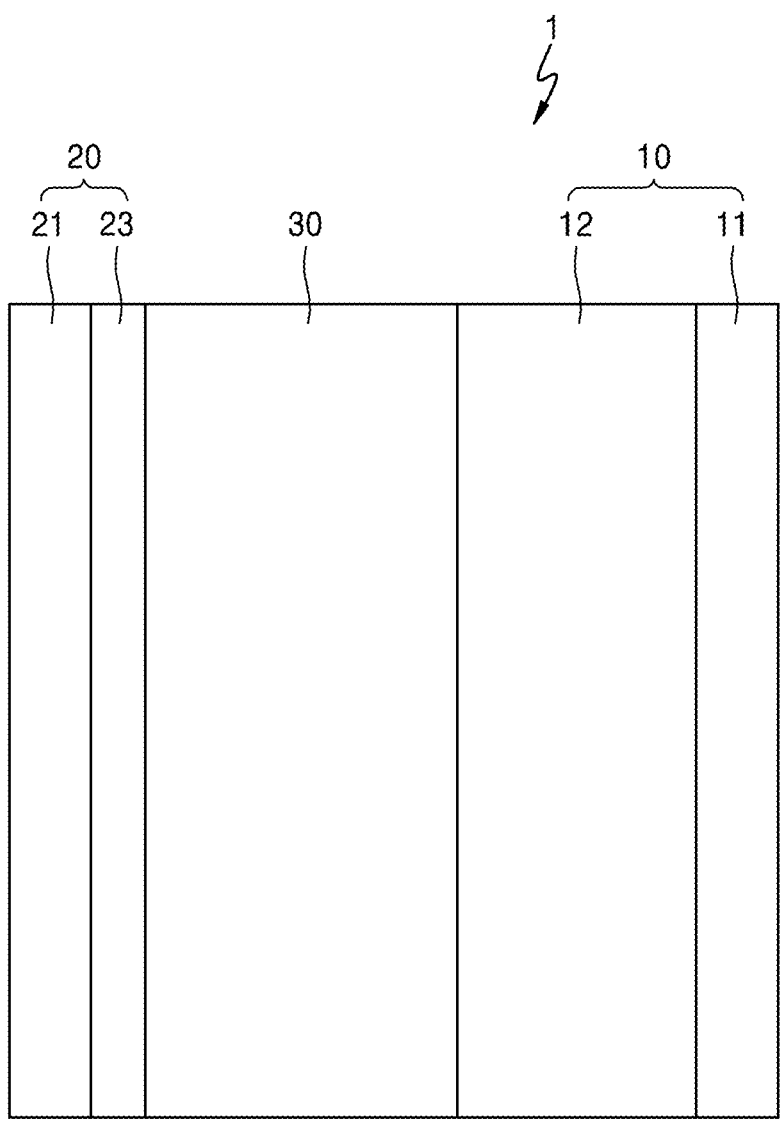
FIG. 12 is a cross-sectional view of an all-solid secondary battery according to another embodiment.

Referring to FIG. 12, an all-solid secondary battery 1 according to an embodiment may have a structure in which a second anode active material layer 23 is disposed on a cathode current collector 21, and a solid electrolyte layer 30 is directly disposed on the second anode active material layer 23. The second anode active material layer 23 may be, for example, a lithium metal layer or a lithium alloy layer.

Since the solid electrolyte layer 30 includes the sulfide-based solid electrolyte according to any of the above-described embodiments, side reactions of the solid electrolyte layer 30 with a lithium metal layer, i.e., the second anode active material layer 23 may be suppressed, and cycle characteristics of the all-solid secondary battery 1 may be improved.

(Solid Electrolyte Layer)

Referring to FIGS. 9 to 11, the solid electrolyte layer 30 may include the sulfide-based solid electrolyte according to any of the embodiments between the cathode layer 10 and the anode layer 20.

The solid electrolyte layer 30 may further include as additional sulfide-based solid electrolyte, in addition to the sulfide-based solid electrolyte according to any of the above-described embodiments. For example, the solid electrolyte layer 30 may further include a sulfide-based solid electrolyte selected from $Li_2S$—$P_2S_5$, $Li_2S$—$P_2S_5$—LiX (wherein X is a halogen element), $Li_2S$—$P_2S_5$—$Li_2O$, $Li_2S$—$P_2S_5$—$Li_2O$-LiI, $Li_2S$—$SiS_2$, $Li_2S$—$SiS_2$-LiI, $Li_2S$—$SiS_2$—LiBr, $Li_2S$—$SiS_2$—LiCl, $Li_2S$—$SiS_2$—$B_2S_3$-LiI, $Li_2S$—$SiS_2$—$P_2S_5$—LiI, $Li_2S$—$B_2S_3$, $Li_2S$—$P_2S_5$—$Z_mS_n$ (wherein m and n are each independently a positive number; and Z is Ge, Zn or Ga), $Li_2S$—$GeS_2$, $Li_2S$—$SiS_2$—$Li_3PO_4$, $Li_2S$—$SiS_2$-$Li_pMO_q$, (wherein p and q are each independently a positive number; and M is P, Si, Ge, B, Al, Ga, In, or a combination thereof), or a combination thereof. The additional sulfide-based solid electrolyte included in the solid electrolyte layer 30 may be amorphous, crystalline, or in a mixed state thereof.

In an embodiment, the sulfide-based solid electrolyte may further include, for example, an argyrodite-type solid electrolyte represented by Formula 1.

$$Li^+_{12-n-x}A^{n+}X^{2-}_{6-x}Y^-_x \quad \text{Formula 1}$$

In Formula 1, A is P, As, Ge, Ga, Sb, Si, Sn, Al, In, Ti, V, Nb, or Ta; X is S, Se or Te; Y may be Cl, Br, I, F, CN, OCN, SCN, or $N_3$; and $0 \le x \le 2$.

For example, the argyrodite-type solid electrolyte may include $Li_{7-x}PS_{6-x}Cl_x$ (wherein $0 \le x \le 2$), $Li_{7-x}PS_{6-x}Br_x$ (wherein $0 \le x \le 2$), $Li_{7-x}PS_{6-x}I_x$ (wherein $0 \le x \le 2$), or a combination thereof. For example, the argyrodite-type solid electrolyte may include $Li_6PS_5Cl$, $Li_6PS_5Br$, $Li_6PS_5I$, or a combination thereof.

For example, the solid electrolyte layer 30 may further include a binder. The binder included in the solid electrolyte layer 30 may be, for example, a styrene-butadiene rubber (SBR), polytetrafluoroethylene (PTFE), polyvinylidene fluoride (PVDF), or polyethylene. However, embodiments are not limited thereto. Any suitable binder may be used. The binder of the solid electrolyte layer 30 may be the same as or different from the binder of the cathode active material layer 12 and the first anode active material layer 22.

(Cathode Layer)

The cathode layer 10 may include a cathode current collector 11 and the cathode active material layer 12.

The cathode current collector 11 may be a plate or foil including indium (In), copper (Cu), magnesium (Mg), stainless steel, titanium (Ti), iron (Fe), cobalt (Co), nickel (Ni), zinc (Zn), aluminum (Al), germanium (Ge), lithium (Li), an alloy thereof, or a combination thereof. The cathode current collector 11 may be omitted.

The cathode active material layer 12 may include, for example, a cathode active material and a solid electrolyte.

The solid electrolyte in the cathode layer 10 may be the same as or different from the solid electrolyte of the solid electrolyte layer 30. Details of the solid electrolyte may be the same as described above in connection with the solid electrolyte layer 30.

The cathode active material may be capable of absorption and desorption of lithium ions. The cathode active material may be, for example, a lithium transition metal oxide, such as lithium cobalt oxide (LCO), lithium nickel oxide, lithium nickel cobalt oxide, lithium nickel cobalt aluminum oxide (NCA), lithium nickel cobalt manganese oxide (NCM), lithium manganate, or lithium iron phosphate; nickel sulfide; copper sulfide; lithium sulfide; iron oxide; vanadium oxide, or a combination thereof. However, embodiments are not limited thereto. Any cathode active material available in the art may be used. These cathode active materials may be used alone or in a combination of at least two thereof.

The lithium transition metal oxide may be, for example, a compound represented by one of the following formula: $Li_aA_{1-b}B'_bD_2$ (wherein $0.90 \le a \le 1$, and $0 \le b \le 0.5$); $Li_aE_{1-b}B'_bO_{2-c}D_c$ (wherein $0.90 \le a \le 1$, $0 \le b \le 0.5$, and $0 \le c \le 0.05$); $LiE_{2-b}B'_bO_{4-c}D_c$ (wherein $0 \le b \le 0.5$, and $0 \le c \le 0.05$); $Li_aNi_{1-b-c}Co_bB'_cD_\alpha$ (wherein $0.90 \le a \le 1$, $0 \le b \le 0.5$, $0 \le c \le 0.05$, and $0 < \alpha \le 2$); $Li_aNi_{1-b-c}Co_bB'_cO_{2-\alpha}F'_\alpha$ (wherein $0.90 \le a \le 1$, $0 \le b \le 0.5$, $0 \le c \le 0.05$, and $0 < \alpha < 2$); $Li_aNi_{1-b-c}Co_bB'_cO_{2-\alpha}F'_2$ (wherein $0.90 \le a \le 1$, $0 \le b \le 0.5$, $0 \le c \le 0.05$, and $0 < \alpha < 2$); $Li_aNi_{1-b-c}Mn_bB'_cD_\alpha$ (wherein $0.90 \le a \le 1$, $0 \le b \le 0.5$, $0 \le c \le 0.05$, and $0 < \alpha \le 2$); $Li_aNi_{1-b-c}Mn_bB'_cO_{2-\alpha}F_\alpha$ (wherein $0.90 \le a \le 1$, $0 \le b \le 0.5$, $0 \le c \le 0.05$, and $0 < \alpha < 2$); $Li_aNi_{1-b-c}Mn_bB'_cO_{2-\alpha}F'_2$ (wherein $0.90 \le a \le 1$, $0 \le b \le 0.5$, $0 \le c \le 0.05$, and $0 < \alpha < 2$); $Li_aNi_bE_cG_dO_2$ (wherein $0.90 \le a \le 1$, $0 \le b \le 0.9$, $0 \le c \le 0.5$, and $0.001 \le d \le 0.1$); $Li_aNi_bCo_cMn_dGeO_2$ (wherein $0.90 \le a \le 1$, $0 \le b \le 0.9$, $0 \le c \le 0.5$, $0 \le d \le 0.5$, and $0.001 \le e \le 0.1$); $Li_aNiG_bO_2$ (wherein $0.90 \le a \le 1$, and $0.001 \le b \le 0.1$); $Li_aCoG_bO_2$ (wherein $0.90 \le a \le 1$, and $0.001 \le b \le 0.1$); $Li_aMnG_bO_2$ (wherein $0.90 \le a \le 1$, and $0.001 \le b \le 0.1$); $Li_aMn_2G_bO_4$ (wherein $0.90 \le a \le 1$, and $0.001 \le b \le 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \le f \le 2$); $Li_{(3-f)}Fe_2(PO_4)_3$ (wherein $0 \le f \le 2$); and $LiFePO_4$.

In the formulae above, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or combination thereof; F' may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

The compounds listed above as cathode active materials may optionally have a surface coating layer (hereinafter, also referred to as "coating layer"). Alternatively, a mixture of a compound without a coating layer and a compound having a coating layer, the compounds being selected from the compounds listed above, may be used. In some embodiments, the coating layer on the surface of the cathode active material may include a compound of a coating element such as an oxide, a hydroxide, an oxyhydroxide, an oxycarbonate, or a hydroxycarbonate of the coating element. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a combination thereof. In some embodiments, the coating layer may be formed using any method that does not adversely affect the physical properties of the cathode active material. For example, the coating layer may be formed using a spray coating method, a dipping method, or the like. The coating methods are well understood by one of ordinary skill in the art, and thus a detailed description thereof will be omitted.

The cathode active material may include, for example, a lithium salt of a transition metal oxide having a layered rocksalt-type structure among the above-listed lithium transition metal oxides. The term "layered rocksalt-type structure" used herein refers to a structure in which oxygen atomic layers and metal atomic layers are alternately and regularly arranged in the direction of <111> planes, with each atomic layer forming a 2-dimensional (2D) plane. A "cubic rocksalt-type structure" refers to a sodium chloride (NaCl)-type crystal structure, and in particular, a structure in which face-centered cubic (fcc) lattices formed by respective cations and anions are arranged in a way that ridges of the unit lattices are shifted by ½. The lithium transition metal oxide having such a layered rocksalt-type structure may be, for example, a ternary lithium transition metal oxide such as $LiNi_xCo_yAl_zO_2$ (NCA) or $LiNi_xCo_yMn_zO_2$ (NCM) (wherein $0<x<1$, $0<y<1$, $0<z<1$, and $x+y+z=1$). When the cathode active material includes such a ternary lithium transition metal oxide having a layered rocksalt-type structure, the all-solid secondary battery 1 may have further improved energy density and thermal stability.

The cathode active material may be covered with a coating layer as described above. The coating layer may be any known coating layer suitable for a cathode active material of an all-solid secondary battery. The coating layer may include, for example, $Li_2O$—$ZrO_2$.

When the cathode active material includes, for example, a ternary lithium transition metal oxide including Ni, such as NCA or NCM, the all-solid secondary battery 1 may have an increased capacity density and elution of metal ions from the cathode active material may be reduced in a charged state. As a result, the all-solid secondary battery 1 may have improved cycle characteristics in a charged state.

The cathode active material may be in the form of particles having, for example, a true-spherical particle shape or an oval-spherical particle shape. The particle diameter of the cathode active material is not particularly limited, and may be in a range suitable for a cathode active material of an all-solid secondary battery. An amount of the cathode active material in the cathode layer 10 is not particularly limited, and may be in a range suitable for a cathode active material of an all-solid secondary battery.

The cathode layer 10 may further include, in addition to a cathode active material and a solid electrolyte as described above, an additive(s), for example, a conducting agent, a binder, a filler, a dispersing agent, an auxiliary ionic conducting agent, or a combination thereof, but is not limited thereto. The conducting agent may be, for example, graphite, carbon black, acetylene black, Ketjen black, carbon fibers, metal powder, or a combination thereof. The binder may be, for example, a styrene-butadiene rubber (SBR), polytetrafluoroethylene (PTFE), polyvinylidene fluoride (PVDF), polyethylene, or a combination thereof. The dispersing agent, the auxiliary ionic conducting, a coating agent, or any other additives which may be added to the cathode layer 10 may be material(s) suitable for use in a cathode of an all-solid secondary battery.

According to another aspect of the disclosure, a method of preparing a sulfide-based solid electrolyte includes: providing a mixture including a starting material composition including the elements P, S, and Li, and a lithium compound including a halogen element; and reacting the mixture to prepare the sulfide-based solid electrolyte, wherein the sulfide-based solid electrolyte includes: an ionic conductor including a $PS_4^{3-}$ unit, a $P_2S_6^{4-}$ unit, and a $P_2S_7^{4-}$ unit; and the lithium compound containing the halogen element, wherein a molar ratio of the $P_2S_6^{4-}$ unit to the $PS_4^{3-}$ unit may be about 1:1 or greater, and a molar amount of the $P_2S_7^{4-}$ unit with respect to a total molar amount of the $PS_4^{3-}$ unit, the $P_2S_6^{4-}$ unit, and the $P_2S_7^{4-}$ unit is about 60% or less. More specifically, the molar ratio of the $P_2S_6^{4-}$ unit to the $PS_4^{3-}$ unit may be about 1:1 to about 5:1 and a molar amount of the $P_2S_7^{4-}$ unit with respect to the total molar amount of the $PS_4^{3-}$ unit, the $P_2S_6^{4-}$ unit, and the $P_2S_7^{4-}$ unit is greater than 0 to about 60%.

The mixture may include a starting material composition including the elements P, S, and Li, and a lithium compound containing a halogen element. For example, the starting material composition including the elements P, S, and Li may include $Li_2S$ and $P_2S_5$. The lithium compound containing a halogen element may be, for example, a lithium halide. The lithium halide may be, for example, LiCl, LiI, LiF, or LiBr. For example, the lithium halide may be LiCl. The mixture may be prepared by mixing the starting material composition and the lithium compound.

For example, the contacting of the mixture to thereby prepare the sulfide-based solid electrolyte may include: milling, e.g., mechanically milling, the mixture to prepare a solid electrolyte precursor; and thermally treating the solid electrolyte precursor at a temperature of about 350° C. or less to prepare the sulfide-based solid electrolyte solid electrolyte.

In the reacting of the mixture, any method, for example, mechanical milling (MM), may be used. For example, when mechanical milling is used, a ball mill may be used to stir and react the starting materials such as $Li_2S$ and $P_2S_5$, to prepare the sulfide-based solid electrolyte precursor. In the mechanical milling, the stirring rate and the stirring time are not specifically limited. The higher the stirring rate, the greater the generation rate of the sulfide-based solid electrolyte precursor. The longer the stirring time, the greater the conversion rate of the starting materials to the sulfide-based solid electrolyte precursor.

Subsequently, the solid electrolyte precursor obtained by, for example, a mechanochemical reaction such as mechanical milling, may be thermally treated at a predetermined temperature and then ground to prepare a solid electrolyte in particle form. When the prepared solid electrolyte has glass transition characteristics, the solid electrolyte may be changed from an amorphous form into a crystalline form by the thermal treatment. The thermal treatment temperature may be, for example, about 350° C. or less, about 340° C. or less, about 330° C. or less, about 320° C. or less, about 310° C. or less, about 300° C. or less, or about 250° C. or less. For example, the thermal treatment temperature may be about 150° C. or greater, about 170° C. or greater, about 190° C. or greater, about 200° C. or greater, or about 210° C. or greater. For example, the thermal treatment temperature may be about 150° C. to about 350° C., about 150° C. to about 300° C., or about 150° C. to about 250° C. When the thermal treatment temperature is within the above-described ranges, it may be easy to obtain a sulfide-based solid electrolyte having a uniform composition.

The thermal treatment time may be, for example, about 1 hour to about 100 hours, about 10 hours to about 80 hours, about 20 hours to about 28 hours, or about 24 hours. When the thermal treatment time is within these ranges, the obtained sulfide-based solid electrolyte may have excellent ionic conductivity and improved stability with respect to lithium metal at the same time.

The thermal treatment atmosphere may be an inert atmosphere. The thermal treatment atmosphere may be created using, for example, nitrogen or argon gas. However, embodiments are not limited thereto. Any gas which may be used to create an inert atmosphere in the art may be used.

In an embodiment, an all-solid secondary battery according to an embodiment may be manufactured by preparing the sulfide-based solid electrolyte by using any of the above-described methods, forming the cathode layer 10, the anode layer 20, and/or the solid electrolyte layer 30, and then laminating the formed layers one to another.

(Formation of Anode Layer)

For example, an anode active material, a conducting agent, and a binder, as ingredients of the first anode active material layer 22, may be added to a polar solvent or a non-polar solvent to prepare a slurry. The prepared slurry may be coated on the anode current collector 21 and then dried to prepare a first laminate. Subsequently, the dried first laminate may be pressed to thereby form the anode layer 20. The pressing may be performed using any method available in the art, not limited to a specific method, for example, roll pressing or flat pressing. The pressing may be omitted.

(Formation of Cathode Layer)

For example, a cathode active material, a conducting agent, a binder and a solid electrolyte as ingredients of the cathode active material layer 12, may be added to a non-polar solvent to prepare a slurry. The prepared slurry may be coated on the cathode current collector 11 and then dried to form a laminate. The obtained laminate may be pressed to thereby form the cathode layer 10. The pressing may be performed using any method available in the art, for example, roll pressing, flat pressing, or isostatic pressing, but is not limited to a specific method. The pressing may be omitted. In some other embodiments, the cathode layer 10 may be formed by compaction molding a mixture of the ingredients of the cathode active material layer 12 into pellets or extending the mixture into a sheet form. When these methods are used to form the cathode layer 10, the cathode current collector 11 may be omitted.

(Formation of Solid Electrolyte Layer)

The solid electrolyte layer 30 may be formed using a solid electrolyte, for example, the sulfide-based solid electrolyte according to any of the above-described embodiments. For example, the solid electrolyte layer 30 may be formed by mixing the sulfide-based solid electrolyte according to any of the embodiments, a solvent, and a binder, coating the mixture, and then drying and pressing the coated mixture. In an embodiment, the sulfide-based solid electrolyte obtained using any of the above-described methods may be deposited using a known film formation method, for example, an aerosol deposition method, a cold spraying method, or a sputtering method, to thereby form the solid electrolyte layer 30. In an embodiment, the solid electrolyte layer 30 may be formed by pressing together solid electrolyte particles.

(Manufacture of All-Solid Secondary Battery)

The cathode layer 10, the anode layer 20, and the solid electrolyte layer 30, which are formed according to the above-described methods, may be stacked such that the solid electrolyte layer 30 is interposed between the cathode layer 10 and the anode layer 20, and then pressed to thereby manufacture the all-solid secondary battery 1.

For example, the solid electrolyte layer 30 may be disposed on the cathode layer 10 to thereby prepare a second laminate. Subsequently, the anode layer 20 (first laminate) may be disposed on the second laminate such that the first anode active material layer 22 contacts the solid electrolyte layer 30 to thereby prepare a third laminate. The third laminate may then be pressed to thereby manufacture the all-solid secondary battery 1. The pressing may be performed, for example, at a temperature of about room temperature to about 90° C. or less, or a temperature of about 20° C. to about 90° C. In an embodiment, the pressing may be performed at a higher temperature of about 100° C. or greater. The pressing time may be, for example, about 30 minutes or less, about 20 minutes or less, about 15 minutes or less, or about 10 minutes or less. For example, the pressing time may be about 1 millisecond (ms) to about 30 minutes, about 1 ms to about 20 minutes, about 1 ms to about 15 minutes, or about 1 ms to about 10 minutes. The pressing method may be, for example, isostatic pressing, roll pressing, or flat pressing. However, embodiments are not limited thereto. Any pressing method available in the art may be used. A pressure applied in the pressing may be, for example, about 500 MPa or less, about 480 MPa or less, about 450 MPa or less, about 400 MPa or less, about 350 MPa or less, about 300 MPa or less, about 250 MPa or less, about 200 MPa or less, about 150 MPa or less, or about 100 MPa or less. For example, the pressure applied in the pressing may be about 50 MPa to about 500 MPa, about 50 MPa to about 480 MPa, about 50 MPa to about 450 MPa, about 50 MPa to about 400 MPa, about 50 MPa to about 350 MPa, about 50 MPa to about 300 MPa, about 50 MPa to about 250 MPa, about 50 MPa to about 200 MPa, about 50 MPa to about 150 MPa, or about 50 MPa to about 100 MPa. Through the pressing under the above-described conditions, for example, the solid electrolyte particles may be sintered to thereby form a single solid electrolyte layer.

Although the constitutions of the all-solid secondary battery and the methods of manufacturing the all-solid secondary battery are described above as embodiments, the disclosure is not limited thereto, and the constituent members of the all-solid secondary battery and the manufacturing processes may be appropriately varied.

An embodiment of the method of preparing a sulfide-based solid eletrolyte according to the present disclosure will now be described in further detail with reference to the following examples. However, these examples are only for illustrative purposes and are not intended to limit the scope of the one or more embodiments of the present disclosure.

EXAMPLES

Example 1

LiCl 5 wt %

1 gram (g) of powder including LiCl (99.9% purity, Aldrich), $Li_2S$ (99.9% purity, Mitsuwa Chemicals), and $P_2S_5$ (99% purity, Aldrich) was prepared and mixed using an agate mortar under an Ar-atmosphere glove box to thereby prepare a mixture.

An amount of LiCl in the mixture was about 5 wt % with respect to a total weight of the mixture, and a molar ratio of $Li_2S$ to $P_2S_5$ was about 75:25.

The mixture and zirconia ($ZrO_2$) balls having a diameter of about 5 millimeters (mm) were put into a container having an internal volume of about 70 milliliters (mL) under an Ar atmosphere and then subjected to mechanical milling at room temperature for about 24 hours for mechanochemical reaction to thereby obtain a solid electrolyte precursor.

After the mechanochemical synthesis process, the $ZrO_2$ balls were separated from the mixing container, and the solid electrolyte precursor in powder form, obtained through the mechanochemical synthesis, was subjected to a first sorting process.

The solid electrolyte precursor after the first sorting was put into an aluminum crucible, thermally treated at a temperature of about 200° C. to about 300° C. for about 1 to 5 hours under Ar atmosphere, cooled down to room temperature, and then recovered to thereby prepare a sulfide-based solid electrolyte. The sulfide-based solid electrolyte had a particle diameter of about 3-5 μm.

Example 2

7 wt % of LiCl

A sulfide-based solid electrolyte was prepared in the same manner as in Example 1, except that the amount of LiCl was changed to about 7 wt %. The sulfide-based solid electrolyte had a particle diameter of about 3-5 μm.

Example 3

9.6 wt % of LiCl

A sulfide-based solid electrolyte was prepared in the same manner as in Example 1, except that the amount of LiCl was changed to about 9.6 wt %. The sulfide-based solid electrolyte had a particle diameter of about 3-5 μm.

Comparative Example 1: 0 wt % of LiCl

A sulfide-based solid electrolyte was prepared in the same manner as in Example 1, except that LiCl was not added.

Comparative Example 2

Argyrodite-Type Solid Electrolyte 1.0 g of powder in which LiCl (99.9% purity, Aldrich), $Li_2S$ (99.9% purity, Mitsuwa Chemicals), and $P_2S_5$ (99% purity, Aldrich) mixed in a stoichiometric ratio to provide a composition of $Li_6PS_5Cl$, under an Ar-atmosphere in a glove box was prepared.

The mixture and zirconia ($ZrO_2$) balls having a diameter of about 4 mm were put into a container having an internal volume of about 70 mL under an Ar atmosphere and then subjected to mechanical milling at room temperature for about 24 hours to facilitate a mechanochemical reaction to thereby obtain a precursor.

The precursor was put into an aluminum crucible, thermally treated at a temperature of about 550° C. for about 6 days in an Ar atmosphere, cooled down to room temperature, and then recovered to thereby prepare a crystalline argyrodite-type solid electrolyte ($Li_6PS_5Cl$).

Example 4

(Formation of Anode Layer)

A nickel (Ni) foil having a thickness of about 10 μm was prepared as an anode current collector. Furnace black (FB-C) having a primary particle diameter of about 76 nm and silver (Ag) particles having an average particle diameter of about 60 nm were prepared as anode active materials.

Mixed powder of furnace black (FB-C) and silver particles in a weight ratio of about 3:1 was used to form an anode layer. Specifically, a polyvinylidene fluoride (PVDF) binder (#9300, available from KUREHA) was added into a container including N-methyl-2-pyrrolidone (NMP) and then dissolved to prepare a first solution. The mixed powder of furnace black (FB-C) and silver particles in a weight ratio of 3:1 was added to the first solution and then mixed with stirring to thereby prepare a slurry. The prepared slurry was coated on a Ni foil with a blade coater and then dried in an air atmosphere at about 80° C. for about 20 minutes. The resulting laminate was vacuum-dried at about 40° C. for about 10 hours. The dried laminate was roll-pressed to planarize a surface of a first anode active material layer of the laminate. Through the above-described process, an anode layer was formed. The first anode active material layer in the anode layer had a thickness of about 5 μm. The amount of the binder in the first anode active material layer was about 6 wt %.

(Formation of Cathode Layer)

$Li_2O$—$ZrO_2$ (LZO)-coated $LiNi_{0.8}Co_{0.15}Mn_{0.05}O_2$ (NCM) was prepared as a cathode active material. The LZO-coated cathode active material was prepared according to a method disclosed in KR 10-2016-0064942. The sulfide-based solid electrolyte powder obtained in Example 1 was prepared as a solid electrolyte. A polytetrafluoroethylene (PTFE) binder (Teflon binder, available from DuPont) was prepared. Carbon nanofibers (CNF) were prepared as a conducting agent. The cathode active material, the solid electrolyte, the conducting agent, and the binder were mixed together in a weight ratio of about 84.2:11.5:2.9:1.4 to obtain a mixture. The mixture was formed into a large sheet by molding, to thereby form a cathode sheet. The cathode sheet was arranged on a carbon-coated aluminum foil having a thickness of about 18 μm used as a cathode current collector and then pressed to thereby form a cathode layer. A cathode active material layer in the cathode layer had a thickness of about 100 μm.

(Preparation of Solid Electrolyte Powder)

A mixture of the sulfide-based solid electrolyte of Example 1 and 1 part by weight of a styrene-butadiene rubber (SBR) binder with respect to 100 parts by weight of the solid electrolyte was prepared. The mixture was stirred with the addition of xylene to thereby prepare a slurry. The slurry was coated on a non-woven fabric by using a blade coater and then dried in the air at about 40° C. to obtain a laminate. The laminate was vacuum-dried at about 40° C. for about 12 hours thereby forming a solid electrolyte layer through the above-described processes.

(Manufacture of All-Solid Secondary Battery)

The solid electrolyte layer was disposed on the anode layer, and the cathode layer was disposed on the solid electrolyte layer to prepare a laminate. The prepared laminate was then treated by plate pressing under a pressure of about 100 MPa at about 25° C. for about 10 minutes to thereby manufacture an all-solid secondary battery. Through the pressing, the solid electrolyte layer was sintered, and characteristics of the all-solid secondary battery were improved.

Example 5

An all-solid secondary battery was manufactured in the same manner as in Example 4, except that the sulfide-based solid electrolyte of Example 1 was used in the cathode layer and the solid electrolyte layer, instead of the sulfide-based solid electrolyte of Example 1.

Example 6

An all-solid secondary battery was manufactured in the same manner as in Example 4, except that the sulfide-based solid electrolyte of Example 3 was used in the cathode layer and the solid electrolyte layer, instead of the sulfide-based solid electrolyte of Example 1.

Comparative Example 3

An all-solid secondary battery was manufactured in the same manner as in Example 4, except that the sulfide-based solid electrolyte of Comparative Example 1 was used in the cathode layer and the solid electrolyte layer, instead of the sulfide-based solid electrolyte of Example 1.

Comparative Example 4

An all-solid secondary battery was manufactured in the same manner as in Example 4, except that the argyrodite-type solid electrolyte of Comparative Example 2 was used in the cathode layer and the solid electrolyte layer, instead of the sulfide-based solid electrolyte of Example 1.

Evaluation Example 1

Ionic Conductivity Measurement

The sulfide-based solid electrolyte powders prepared in Examples 1 to 3 were placed into a mold having a diameter of about 10 nm and then pressed under a pressure of about 350 mPa to form pellets. Then, an indium (In) foil was attached to opposite sides of each pellet to prepare a sample for ionic conductivity measurement. The impedance of each sample was measured using a potentiostat (AUTOLAB PGSTAT30, available from Metrohm Autolab Co. Ltd.) to plot Nyquist plots, and an ionic conductivity at 25° C. was obtained from the Nyquist plots. As a result, the obtained ionic conductivities are shown in Table 1.

TABLE 1

|  | Ionic conductivity [S/cm] |
|---|---|
| Example 1 | $1.95 \times 10^{-3}$ |
| Example 2 | $1.36 \times 10^{-3}$ |
| Example 3 | $1.04 \times 10^{-3}$ |

Referring to Table 1, the sulfide-based solid electrolytes prepared in Examples 1 to 3 were found to have an ionic conductivity of about $1.0 \times 10^{-3}$ or greater.

Evaluation Example 2

Elastic Modulus Measurement

The sulfide-based solid electrolyte powder prepared in Example 1 and the argyrodite-type solid electrolyte powder of Comparative Example 2 were pressed under an isostatic pressure of about 400 MPa at about 25° C. for about 10 minutes to thereby prepare pellets.

An elastic modulus of the pellet sample was measured using a DMA800 (TA Instruments). The elastic modulus is also called Young's modulus.

A storage modulus at a contact depth of about 200 nm was taken as an elastic modulus. The measurement results are shown in Table 2.

TABLE 2

| Examples | Elastic modulus [GPa] |
|---|---|
| Example 1 | 23 |
| Comparative Example 2 | 30 |

Referring to Table 2, as a result of the elastic modulus measurement, the sulfide-based solid electrolyte of Example 1 was found to have a lower elastic modulus as compared with argyrodite-type solid electrolyte of Comparative Example 2.

Accordingly, the sintering temperature and sintering pressure of the sulfide-based solid electrolyte powder of Example 1 may be lower as compared with the sintering temperature and/or sintering pressure of the sulfide-based solid electrolyte powder of Comparative Example 2, making it easier to manufacture an all-solid secondary battery with the sulfide-based solid electrolyte powder of Example 1.

Evaluation Example 3

Raman Spectrum Analysis

The Raman spectra of the sulfide-based solid electrolytes prepared in Examples 1 to 3 and Comparative Example 1 were analyzed. The results are shown in FIG. 1.

Figure 2:
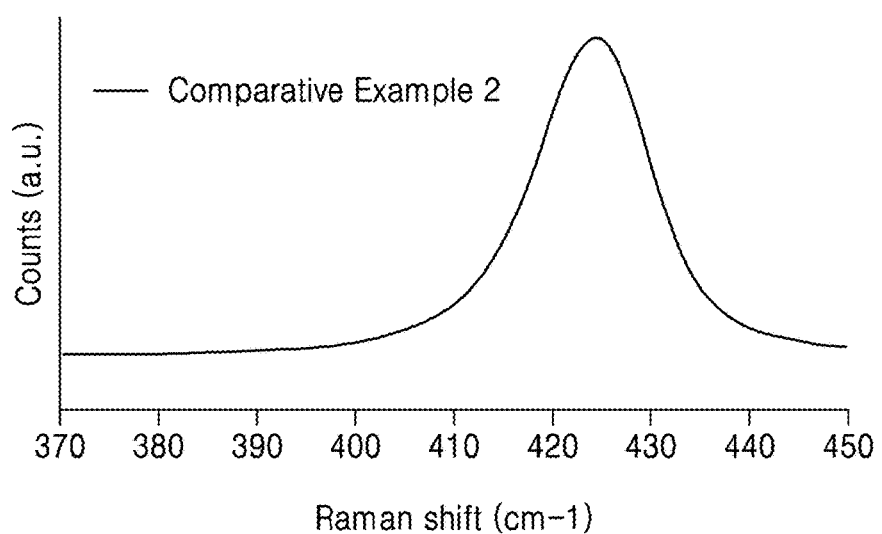
FIG. 2 is a graph of counts (a.u.) versus Raman shift (wavenumbers, $cm^{-1}$), which illustrates the Raman spectrum of an argyrodite-type solid electrolyte prepared in Comparative Example 2.

The Raman spectrum of the argyrodite-type solid electrolyte prepared in Comparative Example 2 is shown in FIG. 2.

Referring to FIG. 1, a peak corresponding to the $PS_4^{3-}$ (ortho-thiophosphate, P—S bond) unit was observed at about 425 cm$^{-1}$, a peak corresponding to the $P_2S_6^{4-}$ (ethane-like structure with a P—P bond) unit was observed at about 390 cm$^{-1}$, and a peak corresponding to the $P_2S_7^{4-}$ (pyro-thiophosphate, P—S bond) unit was observed at about 410 cm$^{-1}$. The proportions of the $PS_4^{3-}$ unit, the $P_2S_6^{4-}$ unit and the $P_2S_7^{4-}$ unit were derived from the peaks corresponding to the $PS_4^{3-}$ unit, the $P_2S_6^{4-}$ unit, and the $P_2S_7^{4-}$ unit, respectively, by using the Lorentzian function. The results are shown in Table 3.

Referring to the Raman spectrum of FIG. 2, only a peak corresponding to the $PS_4^{3-}$ unit was observed in the argyrodite-type solid electrolyte of Comparative Example 2.

Through additional analysis, it was found that the peak corresponding to the $PS_4^{3-}$ unit originated from $Li_4PS_4$, the peak corresponding to the $P_2S_6^{4-}$ unit originated from $Li_4P_2S_6$, and the peak corresponding to the $P_2S_7^{4-}$ unit originated from $Li_7P_3S_{11}$.

TABLE 3

|  | $PS_4^{3-}$ unit [%] | $P_2S_6^{4-}$ unit [%] | $P_2S_7^{4-}$ unit [%] |
|---|---|---|---|
| Example 1 | 20 | 20 | 60 |
| Example 2 | 20 | 50 | 30 |
| Example 3 | 20 | 40 | 40 |
| Comparative Example 1 | 30 | 0 | 70 |

TABLE 3-continued

| | $PS_4^{3-}$ unit [%] | $P_2S_6^{4-}$ unit [%] | $P_2S_7^{4-}$ unit [%] |
|---|---|---|---|
| Comparative Example 2 | 100 | 0 | 0 |

Referring to Table 3, in the sulfide-based solid electrolytes of Examples 1 to 3, including halide ions, a ratio of the $P_2S_6^{4-}$ unit to the $PS_4^{3-}$ unit was 1 or greater, and a proportion of the $P_2S_7^{4-}$ unit with respect to a total of the ion units was about 60% or less.

Meanwhile, in the sulfide-based solid electrolyte of Comparative Example 1 in which no halide ions were included, a ratio of the $P_2S_6^{4-}$ unit to the $PS_4^{3-}$ unit was less than 1, and a proportion of the $P_2S_7^{4-}$ unit with respect to a total of the ion units was greater than 60%.

In the argyrodite-type solid electrolyte of Comparative Example 2, only a peak corresponding to the $PS_4^{3-}$ unit was observed.

Evaluation Example 4

X-Ray Diffraction (XRD) Analysis

Figure 3:
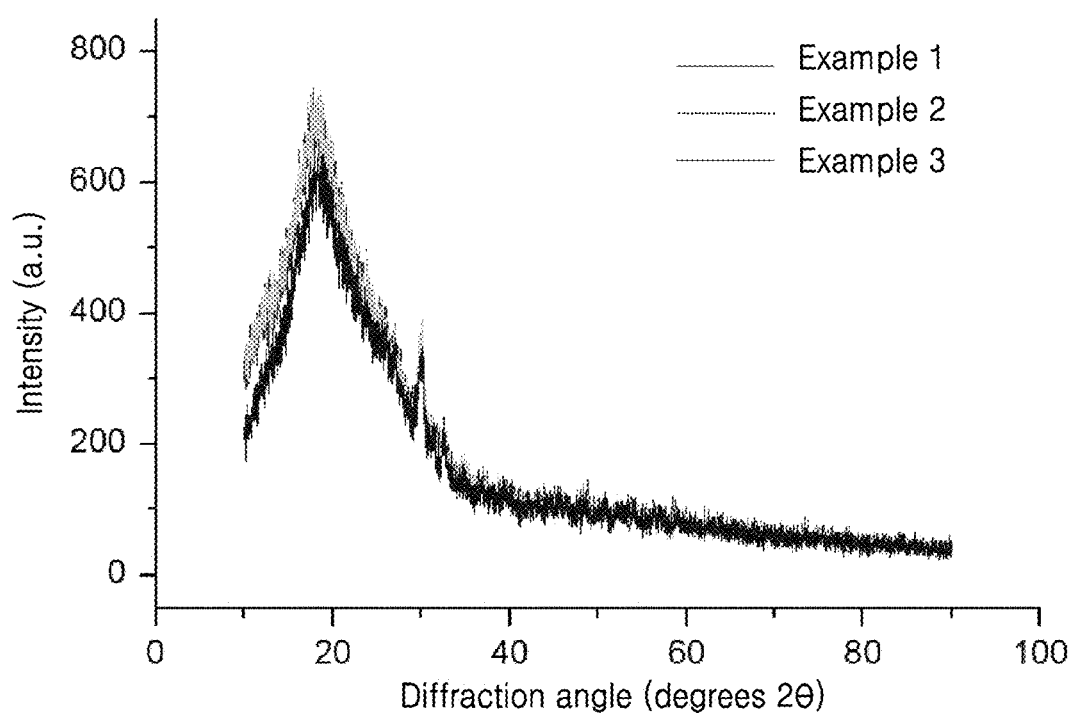
FIG. 3 is a graph of intensity (a.u.) versus diffraction angle (degrees 2-theta, 2θ), which illustrates the results of X-ray diffraction analysis of the sulfide-based solid electrolytes prepared in Examples 1 to 3.
Figure 4:
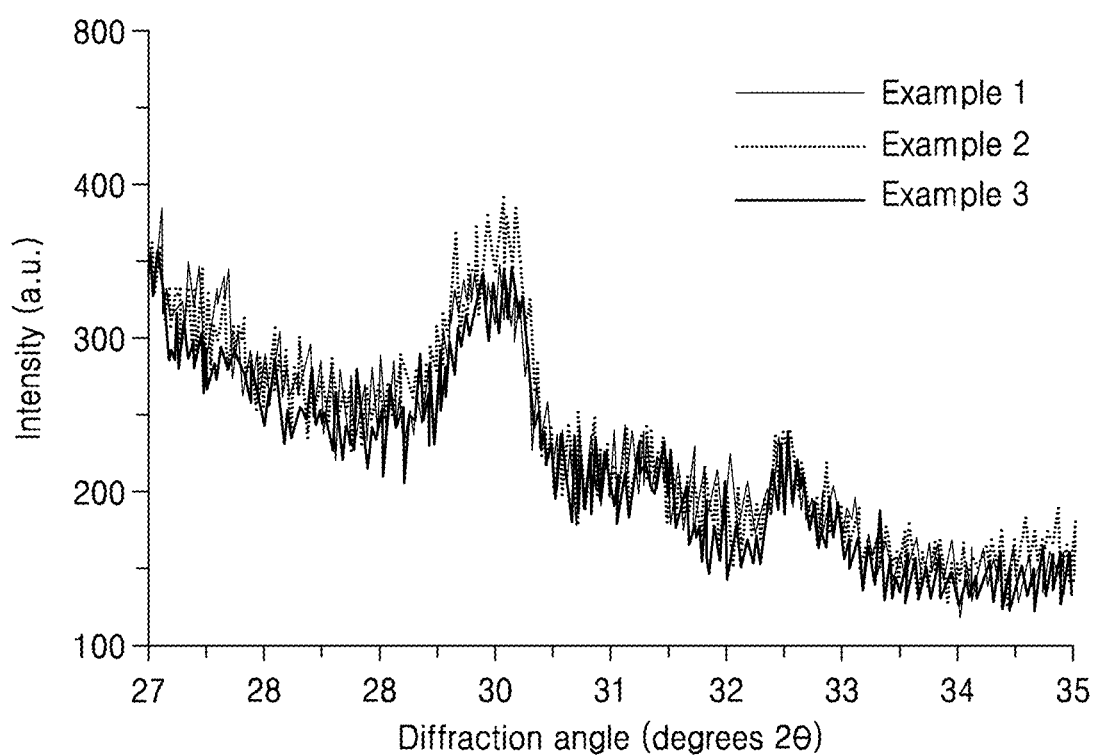
FIG. 4 is an enlarged view of a portion of the graph in FIG. 3.

X-ray diffraction spectra of the sulfide-based solid electrolytes prepared in Examples 1 to 3 were analyzed. The results are shown in FIGS. 3 and 4. FIG. 4 is an enlarged view of a portion of the graph in FIG. 3.

Referring to FIGS. 3 and 4, the sulfide-based solid electrolytes prepared in Examples 1 to 3 were found to be substantially amorphous, but partially exhibit crystalline peaks.

The sulfide-based solid electrolytes prepared in Examples 1 to 3 were glass ceramics including a crystalline phase.

Referring to FIGS. 3 and 4, in the sulfide-based solid electrolytes prepared in Examples 1 to 3, a first peak was observed at a diffraction angle (degrees 2θ) of 29.8°±0.5°, and a second peak at a diffraction angle (degrees 2θ) of 32.5°±0.5°. It was found that the first peak at a 2θ diffraction angle of 29.8°±0.5° corresponds to $Li_7P_3S_{11}$, and the second peak at a 2θ diffraction angle of 32.5°±0.5° corresponds to $Li_4P_2S_6$.

Evaluation Example 5

Evaluation of Solid Electrolyte Composition

The composition of each sulfide-based solid electrolyte powder prepared in Examples 1 to 3 and Comparative Example 1 was analyzed by energy dispersive X-ray spectroscopy (EDX) using a Horiba Energy EX-250 X-MZX20.

Figure 5:
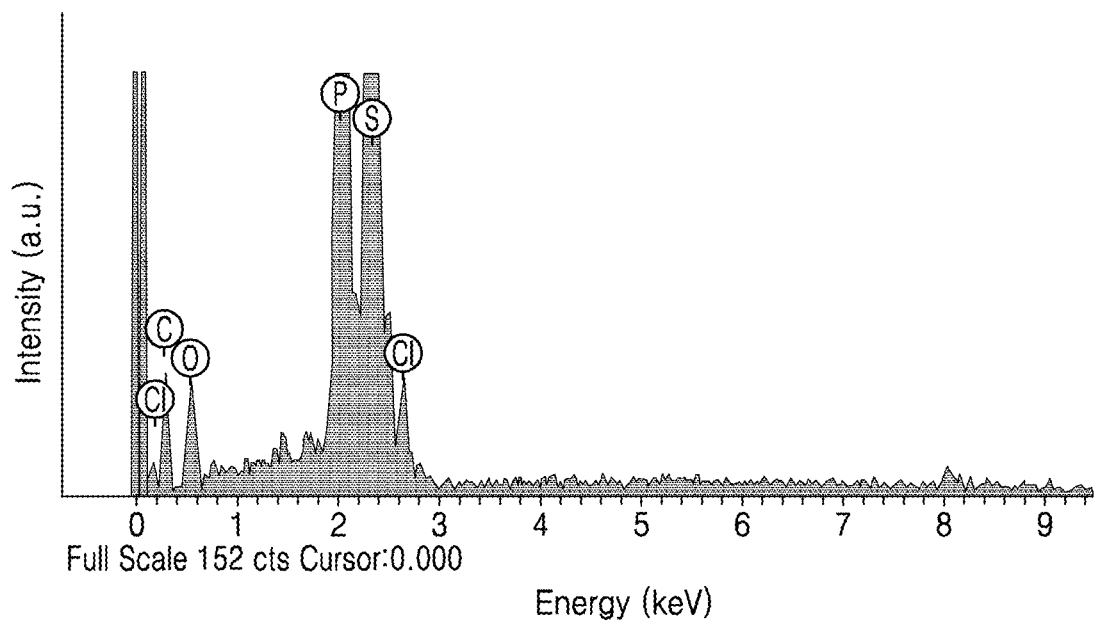
FIG. 5 is a graph of intensity (a.u.) versus energy (kiloelectron volts, keV), which illustrates the results of an energy dispersive X-ray spectroscopy (EDX) analysis of a sulfide-based solid electrolyte powder prepared in Example 1.

Referring to FIG. 5, the sulfide-based solid electrolyte powder prepared in Example 1 was found to contain Cl. The presence of Li, P, and S was also found.

Although not shown, the distribution of Cl over the sulfide-based solid electrolyte powder of Example 1 was also found by EDX mapping.

Figure 6:
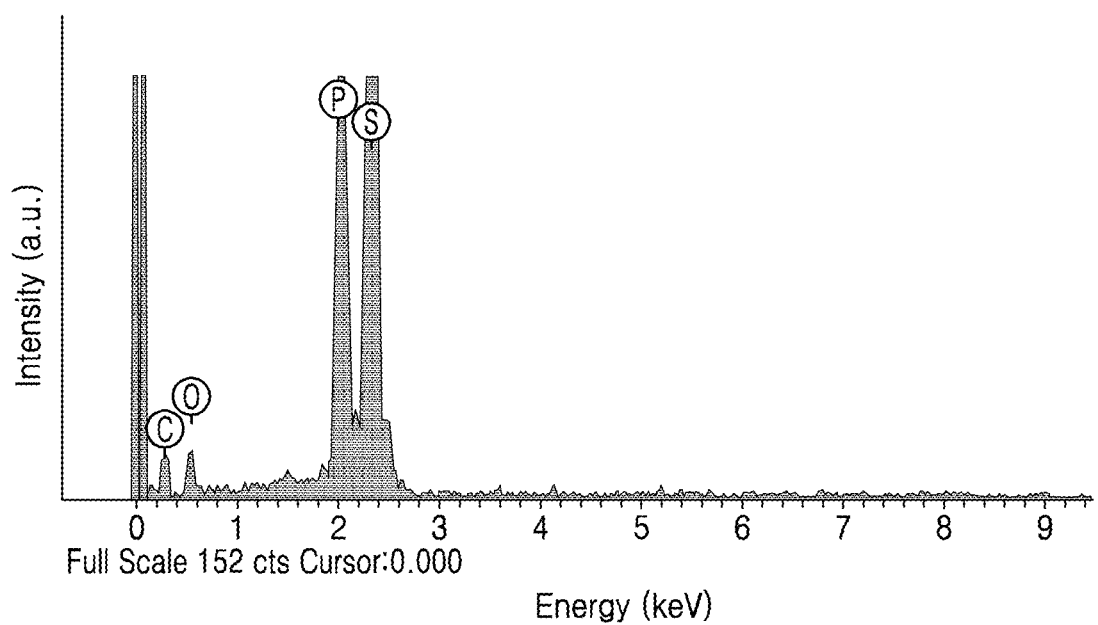
FIG. 6 is a graph of intensity (a.u.) versus energy (kiloelectron volts, keV), which illustrates results of EDX analysis of the sulfide-based solid electrolyte powder prepared in Comparative Example 1.

Meanwhile, as shown in FIG. 6, in the sulfide-based solid electrolyte powder prepared in Comparative Example 1, Cl was not detected, and the presence of only Li, P, and S was found.

Although not shown, the absence of Cl in the sulfide-based solid electrolyte powder prepared in Comparative Example 1 was confirmed by EDA mapping.

Evaluation Example 6

Charge-Discharge Test

Charge-discharge characteristics of the all-solid secondary batteries manufactured in Examples 4 to 6 and Comparative Examples 3 and 4 were evaluated by the following charge-discharge test. The charge-discharge test of the all-solid secondary batteries was performed in a 60° C. thermostatic bath.

At a $1^{st}$ cycle, each all-solid secondary battery was charged with a constant current of 0.1 C for about 12.5 hours until a battery voltage reached 4.25 volts (V), and then discharged with a constant current of 0.1 C until a battery voltage reached 2.5 V to 3.0 V. The charge-discharge cycle was performed twice.

Figure 7:
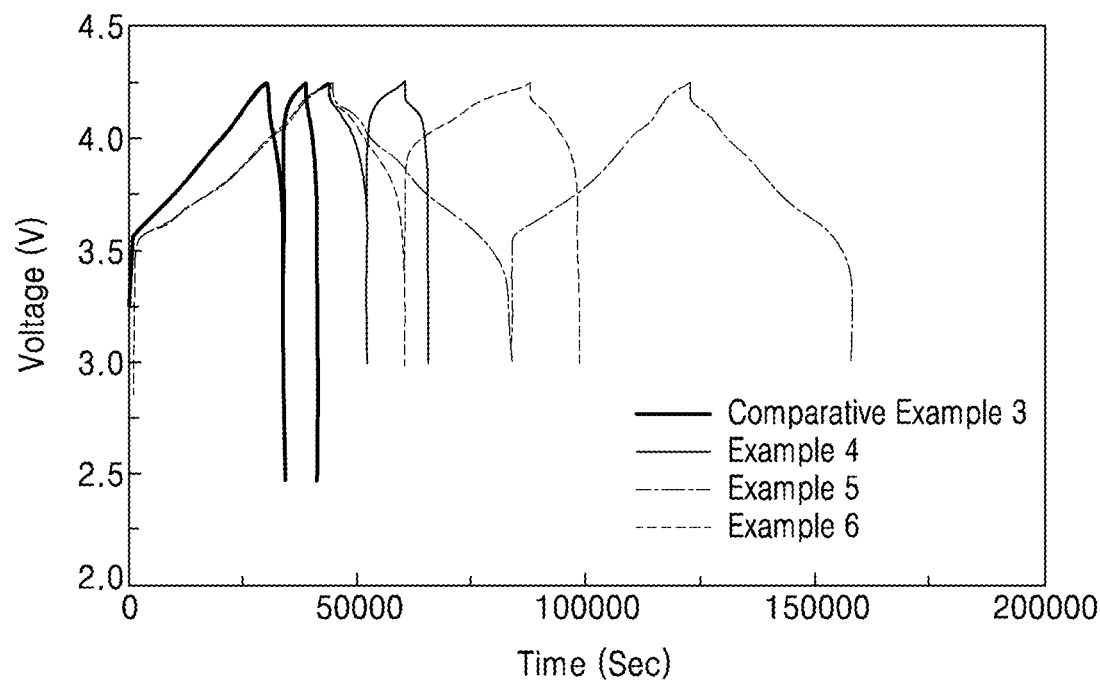
FIG. 7 is a graph of voltage (V) versus time (seconds, sec), which illustrates charge-discharge profiles of all-solid secondary batteries manufactured in Examples 4 to 6 and Comparative Example 3.

Charge-discharge profiles of the all-solid secondary batteries of Examples 4 to 6 and Comparative Example 3 are shown in FIG. 7.

As shown in FIG. 7, the all-solid secondary battery of Example 5 was reversibly charged and discharged at the first and second cycles. At the first and second cycles of the all-solid secondary battery of Example 5, a charge-discharge efficiency represented by Equation 2 was about 50% or greater.

Charge-discharge efficiency (%)=[Discharge capacity/Charge capacity]×100%   Equation 2

A charge capacity at the first cycle of each all-solid secondary battery of Examples 4 and 6 was similar to that of the all-solid secondary battery of Example 5. However, a discharge capacity at the first cycle of each all-solid secondary battery of Examples 4 and 6, and a charge capacity and a discharge capacity at the second cycle thereof were smaller (decreased) as compared with the all-solid secondary battery of Example 5.

A charge capacity at the first cycle of the all-solid secondary battery of Comparative Example 3 was smaller as compared with the all-solid secondary batteries of Examples 4 to 6. A discharge capacity at the first cycle of all-solid secondary battery of Comparative Example 3 and a charge capacity and a discharge capacity at the second cycle thereof were significantly smaller as compared with the all-solid secondary batteries of Examples 4 to 6.

Figure 8:
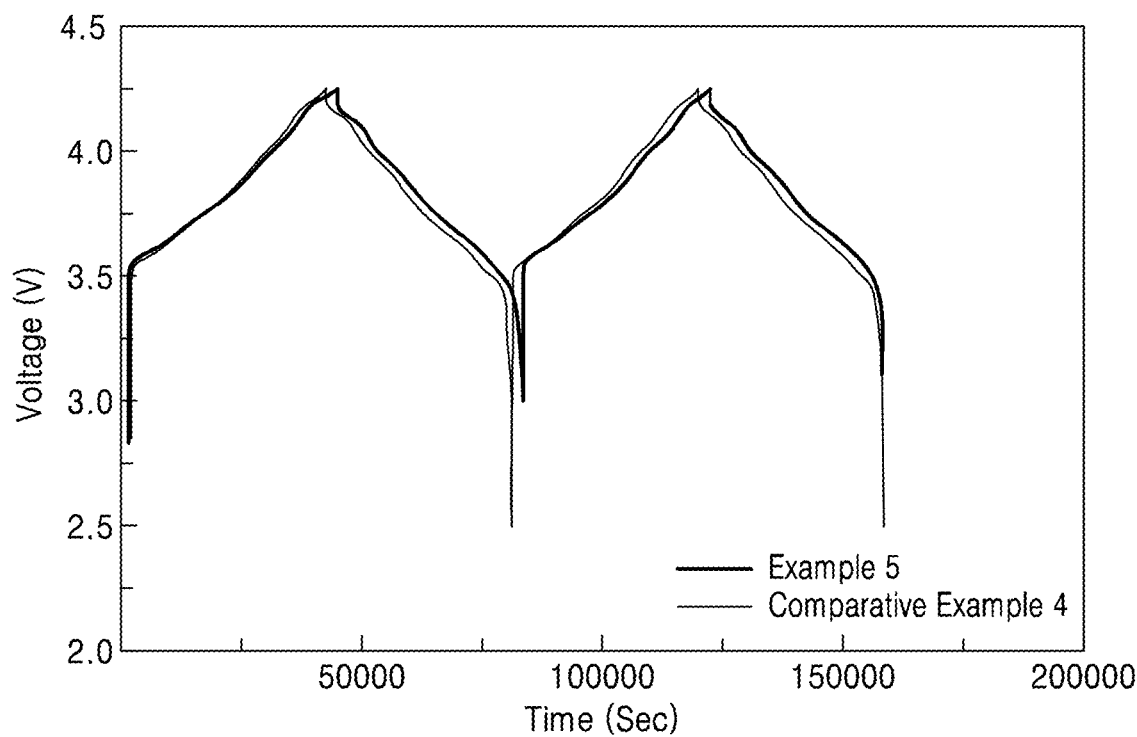
FIG. 8 is a graph of voltage (V) versus time (seconds, sec), which illustrates charge-discharge profiles of all-solid secondary batteries manufactured in Example 5 and Comparative Example 4.

Charge-discharge profiles of the all-solid secondary batteries manufactured in Example 5 and Comparative Example 4 are shown in FIG. 8. As shown in FIG. 8, the all-solid secondary battery of Example 5 was reversibly charged and discharged at the first and second cycles, similar to the all-solid secondary battery of Comparative Example 4.

The all-solid secondary battery of Example 5 exhibited similar charge and discharge characteristics as those of the all-solid secondary battery of Comparative Example 4.

After completion of charging in the first cycle, cross-sections of the all-solid secondary batteries of Examples 4 to 6 and Comparative Examples 3 and 4 were analyzed by scanning electron microscopy (SEM). As a result, it was found that a lithium metal layer corresponding to a second anode active material layer was formed between the first anode active material layer and the anode current collector.

As described above, according to the disclosed embodiment, by inclusion of an ionic conductor including a $PS_4^{3-}$ unit, a $P_2S_6^{4-}$ unit, and a $P_2S_7^{4-}$ unit in a predetermined ratio, and a lithium compound containing a halogen, the sulfide-based solid electrolyte has excellent ionic conductivity and improved stability with respect to lithium metal.

It should be understood that embodiments described herein should be considered in a descriptive sense only and not for purposes of limitation. Descriptions of features or aspects within each embodiment should be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:

1. A sulfide solid electrolyte comprising:
   an ionic conductor comprising a $PS_4^{3-}$ unit, a $P_2S_6^{4-}$ unit, and a $P_2S_7^{4-}$ unit; and
   a lithium compound comprising a LiCl,
   wherein
   a molar ratio of the $P_2S_6^{4-}$ unit to the $PS_4^{3-}$ unit is 1:1 to 5:1,
   a molar amount of the $P_2S_7^{4-}$ unit is greater than 0 to 60% or less, with respect to a total molar amount of the $PS_4^{3-}$ unit, the $P_2S_6^{4-}$ unit, and the $P_2S_7^{4-}$ unit,
   a molar amount of the $PS_4^{3-}$ unit is 5% to 30%, with respect to the total molar amount of the $PS_4^{3-}$ unit, the $P_2S_6^{4-}$ unit, and the $P_2S_7^{4-}$ unit, and
   wherein the sulfide solid electrolyte is amorphous and has an ionic conductivity at room temperature of $1\times10^{-3}$ Siemens per centimeter to $1\times10^{-1}$ Siemens per centimeter.

2. The sulfide-based solid electrolyte of claim 1, wherein the molar ratio of the $P_2S_6^{4-}$ unit to the $PS_4^{3-}$ unit is 2:1 to 5:1, and
   the molar amount of the $P_2S_7^{4-}$ unit with respect to the total molar amount of the $PS_4^{3-}$ unit, the $P_2S_6^{4-}$ unit, and the $P_2S_7^{4-}$ unit is greater than 0 to 40%.

3. The sulfide solid electrolyte of claim 1, wherein, with respect to the total molar amount of the $PS_4^{3-}$ unit, the $P_2S_6^{4-}$ unit, and the $P_2S_7^{4-}$ unit, the proportion of the $P_2S_6^{4-}$ unit is 40% to 80%, and the proportion of the $P_2S_7^{4-}$ unit is greater than the proportion of the $PS_4^{3-}$ unit.

4. The sulfide solid electrolyte of claim 1, wherein the ionic conductor comprises $Li_3PS_4$, $Li_4P_2S_6$, and $Li_7P_3S_{11}$.

5. The sulfide solid electrolyte of claim 4, further comprising a crystalline phase comprising at least one of $Li_3PS_4$, $Li_4P_2S_6$, or $Li_7P_3S_{11}$.

6. The sulfide solid electrolyte of claim 4, wherein, in an X-ray diffraction spectrum of the ionic conductor,
   a first peak corresponding to $Li_7P_3S_{11}$ appears at a diffraction angle of 29.8°±0.5° 2θ, and
   a second peak corresponding to $Li_4P_2S_6$ appears at a diffraction angle of 32.5°±0.5° 2θ.

7. The sulfide solid electrolyte of claim 1, wherein the lithium compound further comprises LiI, LiF, LiBr, or a combination thereof.

8. The sulfide solid electrolyte of claim 1, wherein the amount of the lithium compound is about 3 weight percent to about 22 weight percent, with respect to the total weight of the sulfide solid electrolyte.

9. The sulfide solid electrolyte of claim 1, wherein the sulfide solid electrolyte is a reaction product of a starting material composition comprising the elements P, S, and Li, and
   the lithium compound containing the halogen element.

10. The sulfide solid electrolyte of claim 9, wherein the starting material composition comprises $Li_2S$ and $P_2S_5$.

11. The sulfide solid electrolyte of claim 9, wherein the starting material composition comprises $Li_2S$ and $P_2S_5$ in a molar ratio of about 1:1 to about 9:1.

12. The sulfide solid electrolyte of claim 9, wherein an amount of the lithium compound is about 3 weight percent to about 22 weight percent, with respect to the total weight of the starting material composition and the lithium compound.

13. The sulfide solid electrolyte of claim 1, wherein the sulfide solid electrolyte has an elastic modulus which is less than an elastic modulus of a crystalline argyrodite-type solid electrolyte having a same composition.

14. An all-solid secondary battery comprising:
    a cathode layer;
    an anode layer; and
    a solid electrolyte layer disposed between the cathode layer and the anode layer,
    wherein the solid electrolyte layer comprises the sulfide solid electrolyte according to claim 1.

15. The all-solid secondary battery of claim 14, wherein the all-solid secondary battery has a charge-discharge efficiency of about 50% or greater at a first cycle.

16. A method of preparing a sulfide solid electrolyte, the method comprising:
    providing a mixture comprising
      a starting material composition comprising elements P, S, and Li, and
      a lithium compound comprising a LiCl; and
    treating the mixture to prepare the sulfide solid electrolyte,
    wherein the sulfide solid electrolyte comprises
      an ionic conductor comprising a $PS_4^{3-}$ unit, a $P_2S_6^{4-}$ unit, and a $P_2S_7^{4-}$ unit, and
      the lithium compound containing a LiCl,
    wherein a molar ratio of the $P_2S_6^{4-}$ unit to the $PS_4^{3-}$ unit is 1:1 to 5:1,
    wherein a molar amount of the $P_2S_7^{4-}$ unit is greater than 0 to 60%, with respect to the total molar amount of the $PS_4^{3-}$ unit, the $P_2S_6^{4-}$ unit, and the $P_2S_7^{4-}$ unit,
    a molar amount of the $PS_4^{3-}$ unit is 5% to 30%, with respect to the total molar amount of the $PS_4^{3-}$ unit, the $P_2S_6^{4-}$ unit, and the $P_2S_7^{4-}$ unit, and
    wherein the sulfide solid electrolyte is amorphous and has an ionic conductivity at room temperature of $1\times10^{-3}$ Siemens per centimeter to $1\times10^{-1}$ Siemens per centimeter.

17. The method of claim 16, wherein the mixture is prepared by mixing the starting material composition and the lithium compound.

18. The method of claim 16, wherein the treating of the mixture comprises:
    contacting the mixture to prepare a solid electrolyte precursor; and
    thermally treating the solid electrolyte precursor at a temperature of about 150° C. to about 350° C. to prepare the sulfide solid electrolyte.

19. A sulfide solid electrolyte, comprising:
    an ionic conductor comprising a $PS_4^{3-}$ unit, a $P_2S_6^{4-}$ unit, and a $P_2S_7^{4-}$ unit; and
    a lithium compound comprising a LiCl, wherein an amount of the lithium compound is about 3 weight percent to about 22 weight percent with respect to the total weight of the sulfide solid electrolyte,
    wherein a molar ratio of the $P_2S_6^{4-}$ unit to the $PS_4^{3-}$ unit is 1:1 to 5:1,
    a molar amount of the $P_2S_7^{4-}$ unit is greater than 0 to 60%, with respect to the total molar amount of the $PS_4^{3-}$ unit, the $P_2S_6^{4-}$ unit, and the $P_2S_7^{4-}$ unit, a molar amount of the $PS_4^{3-}$ unit is 5% to 30%, with respect to the total molar amount of the $PS_4^{3-}$ unit, the $P_2S_6^{4-}$ unit, and the $P_2S_7^{4-}$ unit, and wherein the sulfide solid electrolyte is amorphous and has an ionic conductivity at room temperature of $1\times10^{-3}$ Siemens per centimeter to $1\times10^{-1}$ Siemens per centimeter, and wherein the sulfide solid electrolyte is a reaction product of a starting material composition comprising the elements P, S, and Li, and the lithium compound containing the halogen element.

20. The sulfide solid electrolyte of claim 13, wherein the sulfide solid electrolyte has an elastic modulus of about 10 gigapascals to about 30 gigapascals.

* * * * *